United States Patent
Onimaru et al.

(10) Patent No.: US 7,759,834 B2
(45) Date of Patent: Jul. 20, 2010

(54) ELECTROMAGNETIC DEVICE

(75) Inventors: Sadahisa Onimaru, Chiryu (JP); Hirofumi Kinjou, Obu (JP); Katsuhiko Oka, Kariya (JP); Daisuke Miyata, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 476 days.

(21) Appl. No.: 11/822,426

(22) Filed: Jul. 5, 2007

(65) Prior Publication Data

US 2008/0007133 A1 Jan. 10, 2008

(30) Foreign Application Priority Data

Jul. 6, 2006 (JP) .............................. 2006-186991
May 23, 2007 (JP) .............................. 2007-137132

(51) Int. Cl.
*H02K 23/26* (2006.01)
*H02K 3/24* (2006.01)

(52) U.S. Cl. ........................................ 310/201; 310/208
(58) Field of Classification Search .......... 310/210–208
See application file for complete search history.

(56) References Cited

U.S. PATENT DOCUMENTS

| | | | |
|---|---|---|---|
| 3,202,558 A * | 8/1965 | Gottung et al. ................ 156/56 |
| 4,321,426 A * | 3/1982 | Schaeffer et al. ............... 174/34 |
| 6,806,612 B2 | 10/2004 | Nakamura et al. |
| 7,034,428 B2 * | 4/2006 | Cai et al. ..................... 310/198 |
| 2005/0162025 A1* | 7/2005 | Sivasubramaniam et al. .. 310/64 |

FOREIGN PATENT DOCUMENTS

| | | | |
|---|---|---|---|
| JP | 05-243036 | | 9/1993 |
| JP | 05243036 A | * | 9/1993 |
| JP | 2003-158840 | | 5/2003 |
| JP | 2004-153874 | | 5/2004 |
| JP | 2006-158024 | | 6/2006 |

* cited by examiner

*Primary Examiner*—Quyen Leung
*Assistant Examiner*—Leda Pham
(74) *Attorney, Agent, or Firm*—Nixon & Vanderhye PC

(57) ABSTRACT

An electromagnetic device includes a plurality of coils formed by winding conductors. At least some of the conductors are constructed by stacking conductor constructional elements so that an eddy current generated by a leakage flux linked to the conductor is divided. An outer insulating member is disposed on an outer circumferential surface of the conductor stack for electrically insulating the conductor stack from another member. An inner insulating member whose thickness is smaller than a thickness of the outer insulating member is disposed between the conductor constructional elements adjoining to each other in the same conductor stack.

22 Claims, 14 Drawing Sheets

ELECTROMAGNETIC DEVICE

CROSS REFERENCE TO RELATED APPLICATION

This application is based on and incorporates herein by reference Japanese Patent Applications No. 2006-186991 filed on Jul. 6, 2006 and No. 2007-137132 filed on May 23, 2007.

FIELD OF THE INVENTION

The present invention relates to an electromagnetic device including a plurality of coils.

BACKGROUND OF THE INVENTION

Patent documents 1 (JP 5-243036A) and 2 (JP 2004-153874A), for example, propose devices for reducing eddy-current loss generated in a coil in an electromagnetic device containing a plurality of coils.

In the document 1, a coil in a first layer and a coil in a second layer in which conductors are wound in opposite directions are electrically connected together to construct one coil unit, and this coil unit is wound on a field core that constructs a stator of a motor.

In the document 2, as opposed to the document 1, one of a plurality of coils positioned on the radially inner side of a stator is constructed by arranging a plurality of conductors whose width is smaller than the conductors constructing the other coil so that an eddy current generated in the coil due to a leakage flux is divided.

With the construction disclosed in the document 1, leakage fluxes from the field core and the like are separately linked to the individual coils. Therefore, eddy-current loss can be reduced in one coil unit. Since the amount of a linked leakage flux differs depending on the position of the coil, however, a relatively large eddy current is generated in the coil positioned in an area where a large amount of a leakage flux is linked. For instance, a leakage flux is linked more to the coil positioned on the radially inner side of the stator, and therefore a larger eddy current is generated in the coil positioned on the radially inner side than in the coil positioned on the radially outer side.

With the construction disclosed in the document 2, meanwhile, the conductor of the coil on the radially inner side where a larger amount of a leakage flux is linked is split into a plurality of pieces so that an eddy current is divided. Therefore, eddy-current loss can be reduced by the electrical resistance between the split conductors. However, the entire surfaces of the split conductors are insulatively coated by disposing an insulating member on the surfaces, and they are bonded together so as to obtain a desired width. Thus, the conductor that constructs the coil on the radially inner side is formed. Therefore, though the effect of reducing eddy-current loss is increased with increase in the number of split conductors, the proportion of insulating members is increased and a filling factor of conductors or an occupancy factor of space is lowered. That is, if an attempt is made to ensure a certain filling factor, the number of split conductors is limited, and the effect of reducing eddy-current loss may not be sufficiently obtained.

SUMMARY OF THE INVENTION

It is therefore an object of the invention to provide an electromagnetic device, wherein eddy-current loss is reduced without reducing filling factor.

The present invention is based on a finding that, when a conductor of a coil is constructed by stacking conductor constructional elements so that an eddy current generated by a leakage flux linked to the conductor is divided, an eddy current is effectively reduced by an oxide film having insulation properties formed on the surface of a conductor constructional element or projections and depressions on the surface of a conductor constructional element. This means that an eddy current can be reduced by a contact resistance even though an insulating member is not disposed between conductor constructional elements adjoining to each other.

According to a first aspect of the invention, an outer insulating member that electrically insulates a conductor stack formed by stacking and another member having a potential difference relative to the conductor is disposed only on the outer circumferential surface of the conductor stack, and no inner insulating member is disposed between conductor constructional elements having a potential difference smaller than the above potential difference. Therefore, reduction in filling factor can be suppressed. In addition, at least some of conductors are constructed by stacking conductor constructional elements so that an eddy current generated by a leakage flux linked to those conductors is divided. The contact resistance between the conductor constructional elements adjoining to each other makes an electrical resistance against eddy currents. Therefore, eddy-current loss can be reduced. That is, it is possible to reduce eddy-current loss without reduction in filling factor of conductors.

The outer insulating member provides not only the effect of electrically insulating a conductor stack and another member having a potential difference relative to that conductor. It makes an electrical resistance against eddy currents depending on its disposition.

Of conductors that respectively construct a plurality of coils, at least some only have to be conductor stacks. For example, this only has to be applied to conductors that construct coils to which a large amount of a leakage flux is linked. However, this may be applied to all the conductors that respectively construct a plurality of coils.

According to a second aspect of the invention, an outer insulating member that electrically insulates a conductor stack constructed by stacking and another member having a potential difference relative to the conductor is disposed on the outer circumferential surface of the conductor stack, and an inner insulating member that makes an electrical resistance against eddy currents is disposed between conductor constructional elements having a potential difference smaller than the above potential difference. Therefore, eddy-current loss can be reduced. Further, the thickness of the inner insulating member is made smaller than that of the outer insulating member. Therefore, reduction in filling factor can be suppressed as compared with conventional constructions in which each of split conductors is insulatively coated with its entire surface being coated. That is, it is possible to reduce eddy-current loss without reduction in filling factor.

The inner insulating member is disposed between the conductor constructional elements. Therefore, though the effect of suppressing reduction in filling factor is reduced, eddy-current loss can be reduced more.

Also, of conductors that respectively construct a plurality of coils, at least some of them only have to be conductor stacks. For example, this only has to be applied to conductors that construct coils to which a large amount of a leakage flux is linked. However, this may be applied to all the conductors that respectively construct a plurality of coils.

BRIEF DESCRIPTION OF THE DRAWINGS

The above and other objects, features and advantages of the present invention will become more apparent from the following description made with reference to the accompanying drawings. In the drawings.

DETAILED DESCRIPTION OF THE PREFERRED EMBODIMENTS

The present invention will be described in detail with reference to various embodiments of a three-phase induction motor as an example of electromagnetic device including a plurality of coils formed by winding a conductor.

First Embodiment

Figure 1:
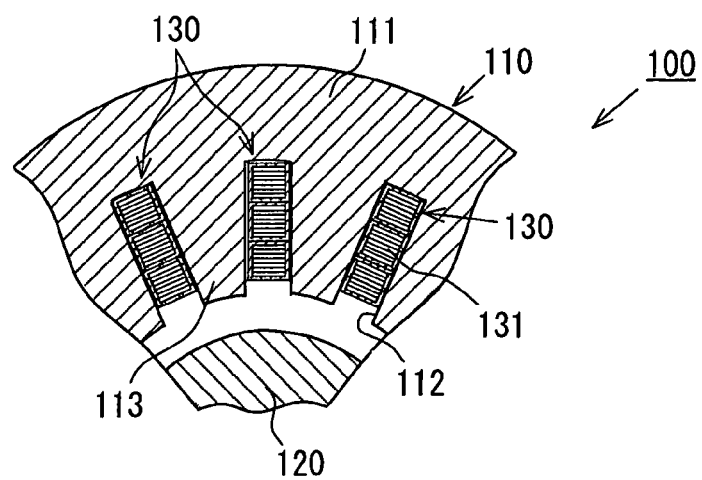
FIG. 1 is a sectional view illustrating a peripheral area of a stator of a motor in a first embodiment of the present invention.

As illustrated in FIG. 1, a plurality of coils 130 in three phases are wound on a stator 110 of a motor 100, which has a rotor 120. In a core 111 constructing the stator 110, there are formed a plurality of slots 112, and the coils 130 equivalent to three phases (U phase, V phase, and W phase) are housed in these slots 112. The stator 110 has a plurality of teeth 113 between the two slots 112. Each coil 130 is constructed by lap-wound windings 131 in three layers. Each winding 131 corresponds to a conductor.

Figure 2:
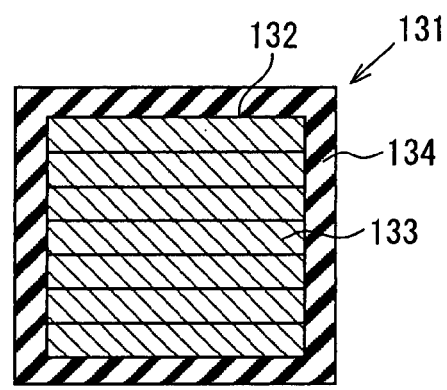
FIG. 2 is a sectional view illustrating a winding in the first embodiment.

As illustrated in FIG. 2, the winding 131 has a conductor stack 132 as a portion to which at least a leakage flux is linked (portion housed in the slot 112). The winding 131 in a rectangular sectional shape may be changed to different sectional shape. The sectional dimensions of the windings 131 vary depending on usage. For a motor of specifications (motor diameter: 300 mm, motor output: 10 to 50 kW or so) for use in a power source for hybrid electric vehicles, for example, the sectional dimensions are 1.5 to 2 mm square or so.

There is no special restriction on the constituent material or sectional shape of the conductor stack 132. This embodiment adopts conductor stacks 132 made of copper in a rectangular sectional shape. All the conductor stacks 132 that respectively construct the coils 130 are constructed by stacking conductor constructional elements 133, so that an eddy current generated by a leakage flux linked to the conductor stack 132 is divided. In this embodiment, each conductor constructional element 133 is constructed by splitting one conductor into a plurality of pieces along the direction of its length (splitting it in the radial direction). The conductor stack 132 is constructed by stacking a plurality of flat plate-like conductor constructional elements 133 (seven elements in this embodiment) with the split planes used as stacking planes. That is, the conductor stack 132 is constructed of a plurality of conductor constructional elements 133. The conductor constructional element 133 need not be constructed by splitting one conductor. For example, a thin member a plurality of which can be stacked to construct the conductor stack 132 may be used as the conductor constructional element 133.

The stacking planes of the conductor constructional elements 133 are not coated with insulating material. That is, no insulating member is disposed between conductor constructional elements 133 connecting to each other. An outer insulating member 134 is disposed only on the outer circumferential surface of the conductor stack 132 formed by stacking. The outer circumferential surface of the conductor stack 132 is equivalent the planes of the conductor constructional elements 133 excluding their stack planes (contact planes directly contacting each other).

The outer insulating member 134 electrically insulates another member having a potential difference relative to the conductor stack 132. More specifically, this other member is a member having between it and the conductor stack 132 a potential difference larger than a potential difference generated between conductor constructional elements 133 connecting to each other by dividing an eddy current. In this embodiment, this other member is a coil 130 in a different phase, that is, a conductor stack 132 that constructs such a coil or the core 111. There is no special restriction on the constituent material or thickness of the outer insulating member 134, and any insulating member can be adopted as long as it can fulfill the above functions. This embodiment adopts a cylindrical outer insulating member 134 made of synthetic resin (e.g., enamel), and the outer circumferential surfaces of the conductor stack 132 are covered with this synthetic resin along the direction of their length. When the conductor stack 132 in a cylinder is adopted in the outer insulating member 134, it is possible to fulfill an electrically insulating function and further hold the conductor stack 132. In addition, degradation in the reliability of the conductor stack 132 due to corrosion or the like can be suppressed.

The winding 131 can be formed, for example, by: stacking a predetermined number of conductor constructional elements 133 to construct the conductor stack 132; and thereafter, maintaining the stacking and applying synthetic resin to the outer circumferential surfaces of the conductor stack 132. Alternatively, it can also be constructed by inserting and disposing conductor constructional elements 133 in the outer insulating member 134 formed in a cylindrical shape.

Figure 3:
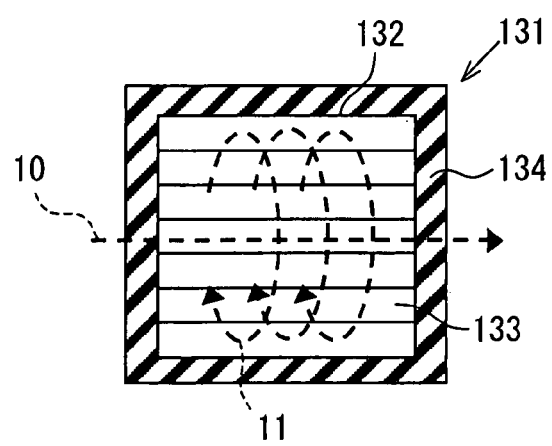
FIG. 3 is a schematic view illustrating the state of eddy currents generated in a conductor that constructs a winding.

As illustrated in FIG. 3, eddy currents flow in the conductor stack 122 that constructs the winding 131. In the winding 131, the conductor stack 132 is constructed by stacking a plurality of conductor constructional elements 133 in the radial direction so that eddy currents 11 generated by leakage flux 10 linked to the conductor stack 132 is divided. Though an insulating member is not disposed between conductor constructional elements 133 connecting to each other, the generation of eddy current 11 between the layers of conductor constructional elements 133 is suppressed. The generation of an eddy current is suppressed by a contact resistance generated by: an oxide film having insulation properties formed on the surface of a conductor constructional element 133; or projections and depressions in the surface of a conductor constructional element 133. In FIG. 3, eddy currents 11 are illustrated in a lump for simplicity. That is, a contact resistance is used as an electrical resistance against eddy currents 11 generated in the conductor stack 132 due to the leakage flux 10.

In this embodiment, the outer insulating member 134 is disposed only on the outer circumferential surface (four faces of top, bottom, left and right in FIG. 3) of the conductor stack 132, and no insulating member is disposed between connecting conductor constructional elements 133. Therefore, reduction in filling factor can be suppressed as compared with conventional windings constructed by stacking conductors. The conductor stack 132 is formed by stacking a plurality of conductor constructional elements 133 so that the eddy current 11 is divided. The contact resistance between conductor constructional elements 133 connecting to each other makes an electrical resistance against eddy currents 11. Therefore, eddy-current loss can be reduced. That is, it is possible to suppress reduction in filling factor and further reduce eddy-current loss.

In this embodiment, the outer insulating member 134 is provided in the cylindrical shape so as to cover the outer circumferential surface of the conductor stack 132. When the outer insulating member 134 is disposed on the side where the leakage flux 10 is exerted, the outer insulating member 134 makes an electrical resistance against eddy currents 11. Therefore, eddy-current loss can be reduced.

The above conductor is tested. A copper plate, 1.8 mm in width in the direction of its short side and 0.2 mm in thickness, was adopted as the conductor constructional element 133. This conductor constructional element 133 was stacked in nine layers in the direction of thickness to construct a conductor stack 132. Using this conductor stack 132, eddy-current loss was measured. The result of the measurement was such that the eddy-current loss was reduced to substantially ⅛ for the conductor stack 132, 1.8 mm square in section. When comparison was made for filling factor without the outer insulating member 134, the following was revealed. In the winding 131 in this embodiment, the filling factor is 100%. If an insulating coating of 30 μm is applied to an outer surface of each conductor constructional element in a conventional manner, it turns out that an insulating member of 60 μm is disposed in each of the eight gaps between nine layers. In this case, the filling factor is 80.3%. With the construction in this embodiment, eddy-current loss can be reduced without degrading a filling factor.

Figure 4:
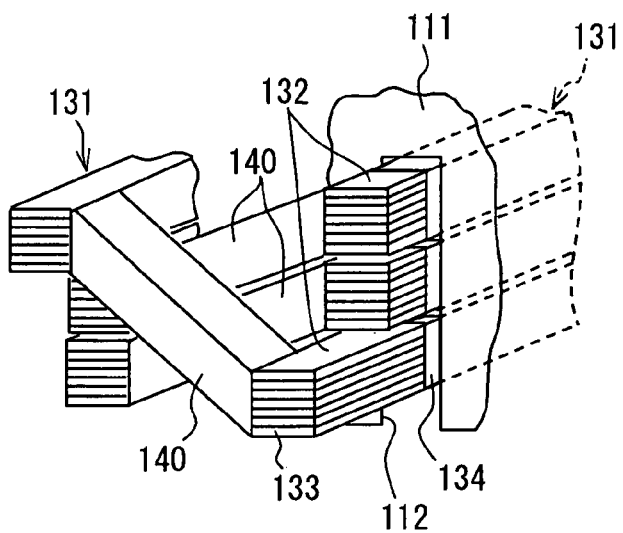
FIG. 4 is a perspective view illustrating an example of a coil end.

A coil end in the winding 131 is shown in FIG. 4. The conductor stack 132 of the winding 131 is linear. The portion of the conductor stack 132 housed in the slot 112 provided in the core 111 is covered with the outer insulating member 134. Both ends exposed from the slot 112 to outside the core 111 are exposed from the outer insulating member 134. This exposure structure can be achieved by removing the outer insulating member 134 or preventing the outer insulating member 134 from being disposed at exposed portions.

At an end of the conductor stack 132 exposed from the outer insulating member 134, conductor stack constructional elements 133 are integrated together by brazing, welding, or the like (not shown). The end of the integrated conductor stack 132 is joined with one end of a connecting member 140 (e.g., copper wire) formed of a rod-like metal material as part of a winding 131 by brazing, welding, or the like (not shown). The other end of the connecting member 140 is joined with a portion of another winding 131 similarly by brazing, welding, or the like (not shown), and a coil 130 is thereby constructed. In FIG. 4, this other winding is a linear other conductor stack 132 constructed by stacking. That is, the winding 131 is constructed of the conductor stack 132 and the connecting member 140, and in turn, the coil 130 is constructed. The end of the conductor stack 132 and the surface of the connecting member 140 are covered with an insulating member (not shown) as are joined together. This covering can be achieved by applying, for example, synthetic resin after such processing as brazing, welding, or the like.

After the conductor constructional elements 133 are stacked (after the conductor stack 132 is constructed), the conductor stack 132 can be easily bent in the direction of stacking but is difficult to bend in the direction perpendicular to the direction of stacking. Therefore, when an attempt is made to bend the conductor stack itself to electrically connect it to another conductor stack 132, the direction of connection is limited. In this embodiment, meanwhile, the ends of the conductor stacks 132 are electrically connected to each other by the connecting member 140 different from the conductor stacks 132. Therefore, when conductor stacks 132 or a conductor stack 132 and a portion of a winding 131 excluding the conductor stack 132 and a connecting member 140 are electrically connected to each other to construct the coil 130, the conductor stack 132 need not be bent. When the connecting member 140 is used as mentioned above, the direction of connection is not limited and a variety of methods for winding a coil 130 can be coped with.

Figure 5:
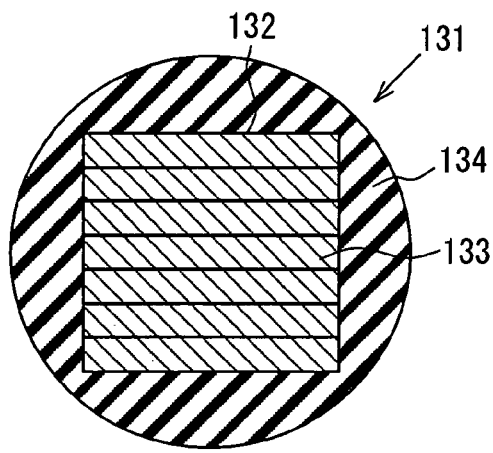
FIG. 5 is a sectional view illustrating a modification to a winding.

In the first embodiment, the winding 131 in a rectangular sectional shape is taken as an example. Instead, a winding 131 in a circular sectional shape, illustrated in FIG. 5 as an example, may also be adopted as a modification to the rectangular shape.

Figure 6:
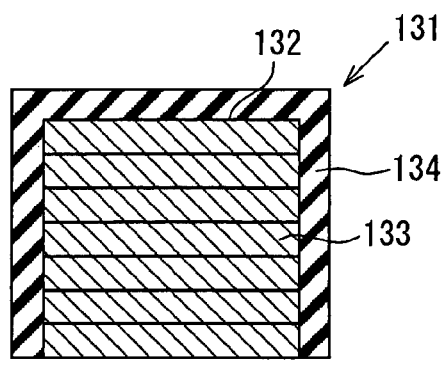
FIG. 6 is a sectional view illustrating a modification to a winding.

In the first embodiment, the outer insulating member 134 need not be cylindrical. The outer insulating member 134 electrically insulates another member having a potential difference relative to the conductor stack 132. More specifically, this other member is a member having between it and the conductor stack 132 a potential difference larger than a potential difference generated between conductor constructional elements 133 connecting to each other by dividing an eddy current 11. In this embodiment, this other member is a coil 130 in a different phase, which is a conductor stack 132 that constructs such a coil or the core 111. For example, when coils 130 in respective phases are included as coils as in this embodiment, the outer insulating member 134 only has to be disposed as follows: it only has to be disposed at least at a portion of the outer circumferential surface of the conductor stack 132 opposed to a conductor that constructs a coil in a different phase. With this construction, a potential difference generated between phases can be insulated by the outer insulating member 134. In such a construction that coils 130 are respectively wound on a core 111, as described in relation to this embodiment, the outer insulating member 134 only has to be disposed at the following portion: a portion of the outer circumferential surface of the conductor stack 132 opposed to the core 111. With this construction, an amount of a leakage flux 10 going from the core 111 and through a conductor stack 132 can be reduced by the outer insulating member 134. In addition, a potential difference generated between the core 111 and the conductor stack 132 can be insulated by the outer insulating member 134. As illustrated in FIG. 6 as an example, therefore, the outer insulating member may be so provided that it covers only at least portions required to ensure electrical insulation of the outer circumferential surface of a conductor stack 132.

In the example in FIG. 6, three of the four sides are required to ensure electrical insulation. If the outer insulating member 134 is constructed not in a cylindrical shape, it is difficult to hold a plurality of conductor constructional elements 133 by only the outer insulating member 134. To cope with this, ends of the conductor stacks 132 to be connected with the connecting member 140 are integrated beforehand by brazing, welding, or the like, and thereafter the outer circumferential surface of the conductor stack 132 is coated by applying synthetic resin or other like means.

Figure 7:
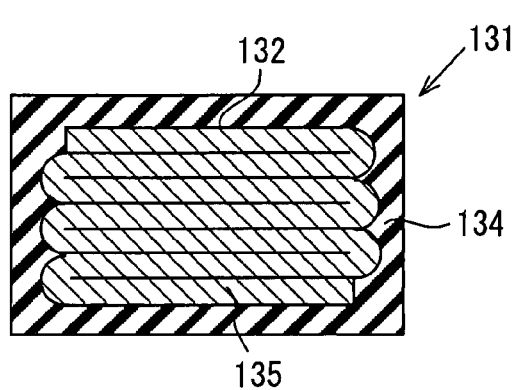
FIG. 7 is a sectional view illustrating a modification to a winding.

As illustrated in FIG. 7, the conductor stack 132 may be constructed by folding back one conductor constructional element 135. In this example, the conductor constructional element is folded back more than once. However, there is no special restriction on the number of folding times. In this case, layers are connected at end faces. Therefore, though the effect of reducing eddy-current loss is reduced as compared with cases where the conductor stack 132 is constructed by stacking a plurality of conductor constructional elements 133, the productivity can be enhanced. The winding 131 can be formed by: folding back a conductor constructional element 135 to construct a conductor stack 132; and thereafter, maintaining the stacking and applying synthetic resin to the outer circumferential surface of the conductor stack 132. Alternatively, it can also be constructed by inserting and disposing the conductor stack 132 in the outer insulating member 134 formed in a cylindrical shape.

Second Embodiment

Figure 8:
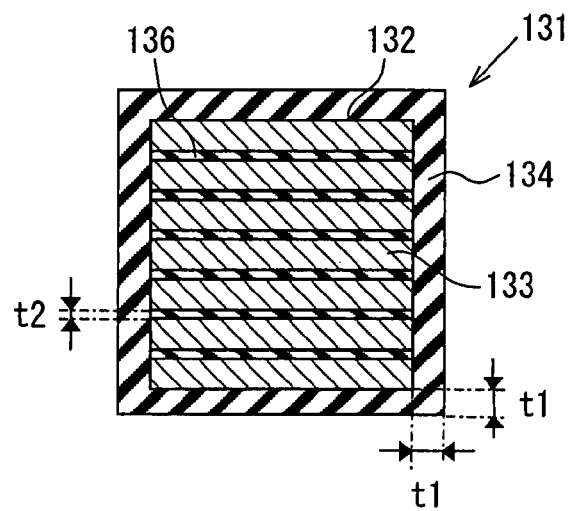
FIG. 8 is a sectional view illustrating a winding in a second embodiment of the present invention.

In the second embodiment, as illustrated in FIG. 8, the outer insulating member 134 is disposed on the outer circumferential surface of the conductor stack 132 that forms at least part of the winding 131. In addition, an inner insulating member 136 is disposed between stack planes of the connecting two conductor constructional elements 133.

There is no special restriction on the constituent material of the inner insulating member 136. This embodiment adopts adhesive (e.g., epoxy adhesive or cyanoacrylate adhesive) for bonding and fixing together conductor constructional elements 133 divided into a plurality of pieces. When adhesive is adopted as the inner insulating member 136, it is possible to fix together a plurality of conductor constructional elements 133 and further reduce eddy-current loss. Therefore, in case the conductor constructional elements 133 are fixed together, the construction can be simplified.

In one and the same winding 131, the thickness t2 of the inner insulating member 136 is set to a value smaller than the thickness t1 of the outer insulating member 134. Specifically, while the thickness t1 of the outer insulating member 134 is 30 to 50 μm (micrometers), for example, the thickness t2 of the inner insulating member 136 is several μm.

Figure 9:
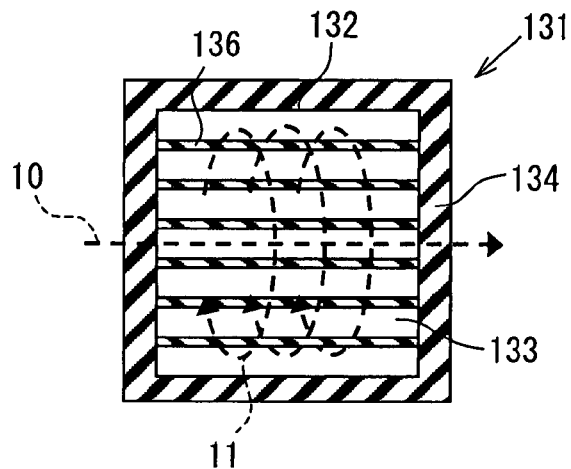
FIG. 9 is a schematic view illustrating the state of eddy currents generated in a conductor that constructs a winding.

In this embodiment, the inner insulating member 136 as an electrical resistance against eddy currents 11 is disposed between the conductor constructional elements 133 as illustrated in FIG. 9. Thus, the generation of the eddy current 11 between the layers of conductor constructional elements 133 is suppressed. Therefore, eddy-current loss can be reduced. In addition, the thickness t2 of the inner insulating member 136 is made smaller than the thickness t1 of the outer insulating member 134. Therefore, reduction in filling factor in the space within the outer insulating member 134 can be suppressed as compared with conventional constructions in which the entire surfaces of the split conductors are insulatively coated. That is, it is possible to suppress reduction in the filling factor and further reduce eddy-current loss. In this embodiment, the inner insulating member 136 is disposed between conductor constructional elements 133. Therefore, though the effect of suppressing reduction in filling factor is reduced as compared with the construction of the first embodiment (FIG. 2), the eddy-current loss can be reduced more.

An experimental test was conducted on a test sample, in which copper plate, 1.8 mm in the width in the direction of its short side and 0.2 mm in thickness, was adopted as the conductor constructional element 133. This conductor constructional element 133 is stacked in nine layers in the direction of thickness and the inner insulating member 136 (adhesive) with a thickness t2 of 1 μm is disposed between the layers to construct the conductor stack 132. Using this conductor stack 132, eddy-current loss was measured. The result of the measurement was such that the eddy-current loss was reduced to substantially 1/16, that is, the eddy-current loss was reduced by one-half as compared with the construction of the first embodiment illustrated in FIG. 2 for the conductor 1.8 mm square. When comparison was made for filling factor without the outer insulating member 134, the following was revealed. In the winding 131 in this embodiment with the inner insulating member 136 (adhesive) with a thickness t2 of 2 μm disposed, the filling factor is 99.1%. If insulating coating of 30 μm is applied to the stack planes of each conductor constructional element, it turns out that an insulating member of 60 μm is respectively disposed in the eight gaps between layers. Therefore, the filling factor is 80.3%. With the construction of this embodiment, eddy-current loss can be reduced without degrading the filling factor.

In the second embodiment, any insulating material can be adopted as long as it makes an electrical resistance against eddy currents 11. When a material that does not have adhesive properties is adopted as the inner insulating member 136, for example, the winding 131 may be constructed by taking the following measure: the conductor constructional element 133 and the inner insulating member 136 are alternately stacked, and the outer insulating member 134 is applied to the outer circumferential surface of the thus obtained stack. Alternatively, the winding 131 may be constructed by inserting and disposing the stack in the cylindrical outer insulating member 134.

Also, the conductor stack 132 may be constructed by folding back one conductor constructional element 135 more than once, as described in relation to the first embodiment (FIG. 7). The outer insulating member may be provided so as to cover only a portion of the outer circumferential surface of the conductor stack 132 required to ensure electrical insulation as described in relation to the first embodiment (FIG. 6). Also, the winding 131 in this embodiment can adopt the coil end structure described in relation to the first embodiment (FIG. 4).

Third Embodiment

Figure 10:
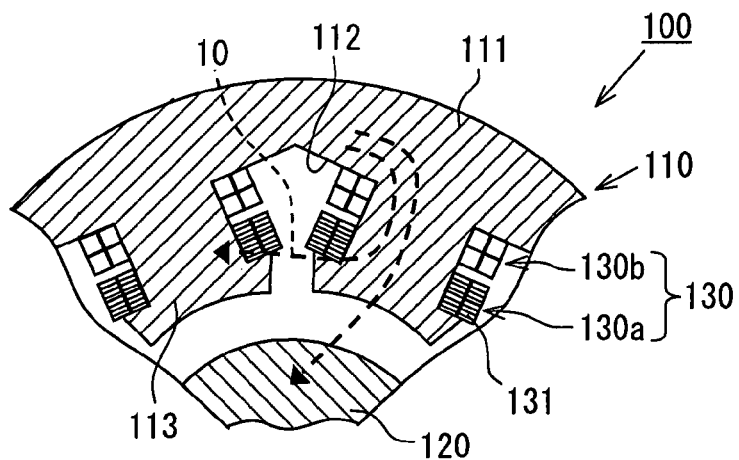
FIG. 10 is a sectional view illustrating a peripheral area of the stator of a motor in a third embodiment of the present invention.
Figure 11:
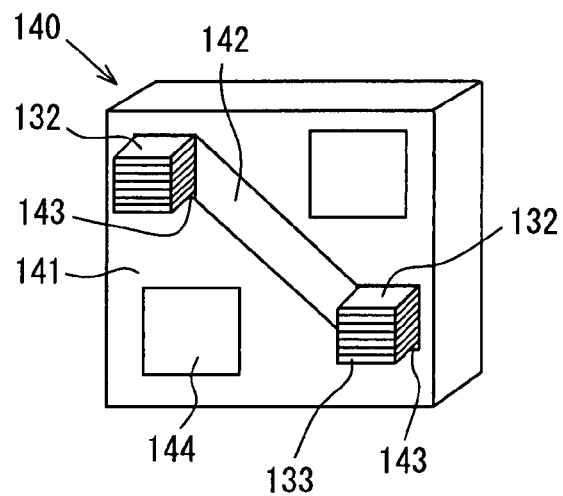
FIG. 11 is a perspective view illustrating a coil end in a fourth embodiment of the present invention.

In the third embodiment, as illustrated in FIG. 10, the winding 131 including the conductor stack 132 of the first embodiment or second embodiment is adopted only for some of the windings that respectively construct a plurality of coils 130.

Specifically, the motor 100 includes two coils 130a, 130b formed by winding windings 131 on the core 111 of the stator 110 in opposite directions. Two coils 130a, 130b are electrically connected together to construct a coil unit. It is known that, when coils 130a, 130b different from each other in the winding direction are wound in two layers on the core 111, leakage fluxes 10 are separately linked to the individual coils 130a, 130b. Therefore, eddy-current loss can be reduced in one coil unit. With this construction, of two coils 130a, 130b, the coil 130a on which a leakage flux 10 is more strongly exerted is constructed of the winding 131 of the construction of the first or second embodiment. This coil is positioned on the radially inner side closer to the rotor 120. The coils 130b on the radially outer side where there is less leakage flux 10 are constructed of ordinary windings.

The winding 131 including the conductor stack 132 of the first embodiment or second embodiment is adopted for the coils 130a to which a larger amount of a leakage flux 10 is linked. Thus, eddy-current loss can be efficiently reduced. Further, a cost can be reduced. In this the winding 131 of the first embodiment or the second embodiment only has to be adopted for at least some of a plurality of coils 130.

Fourth Embodiment

In the fourth embodiment, the connecting member 140 includes a base material 141 made of insulating material and a wiring portion 142 provided in the base material 141. With the conductor stack 132 positioned and fixed in the base material 141, the end of the conductor stack 132 is electrically connected with another conductor stack 132 through the wiring portion 142 to construct the coil 130.

There is no special restriction on the constituent material of the base material 141 as long as it is an insulating material. Further, there is no special restriction on the method for fixing the conductor stacks 132 in the base material 141. The base material 141 is made of synthetic resin and provided with through holes 143 in correspondence with conductor stacks 132. The wiring portion 142 is formed on the inner walls of the through holes 143 and the plane where tips of the conductor stacks 132 are exposed. With the ends (exposed portions) of the conductor stacks 132 inserted in the through holes 143, the ends of the conductor stacks 132 and the wiring portion 142 are joined with each other by soldering, brazing, welding, or the like.

The conductor stacks 132 are positioned and fixed relative to the connecting member 140 by inserting the conductor stacks 132 into through holes 143 formed in the base material 141. Therefore, the productivity can be enhanced. Further, the strength of the coils 130 can be enhanced by the base material 141. An electronic component or components 144 may be mounted on the surface of the base material 141. The electronic component different from the coils 130 can be mounted on the surface of the base material 141. When the electronic component 144 is mounted on the base material 141 that constructs the connecting member 140 as part of the coil 130, the distance of electrical connection between the coil 130 and the electronic component 144 can be reduced, for example.

When one wiring portion 142 is provided in one base material 141, electrical connection with a corresponding winding 131 can be established by a plurality of connecting members 140 by taking the following measure: the length of each of a plurality of conductor stacks 132 exposed from slots 112 to outside the core 111 (FIG. 4) is varied.

Figure 12:
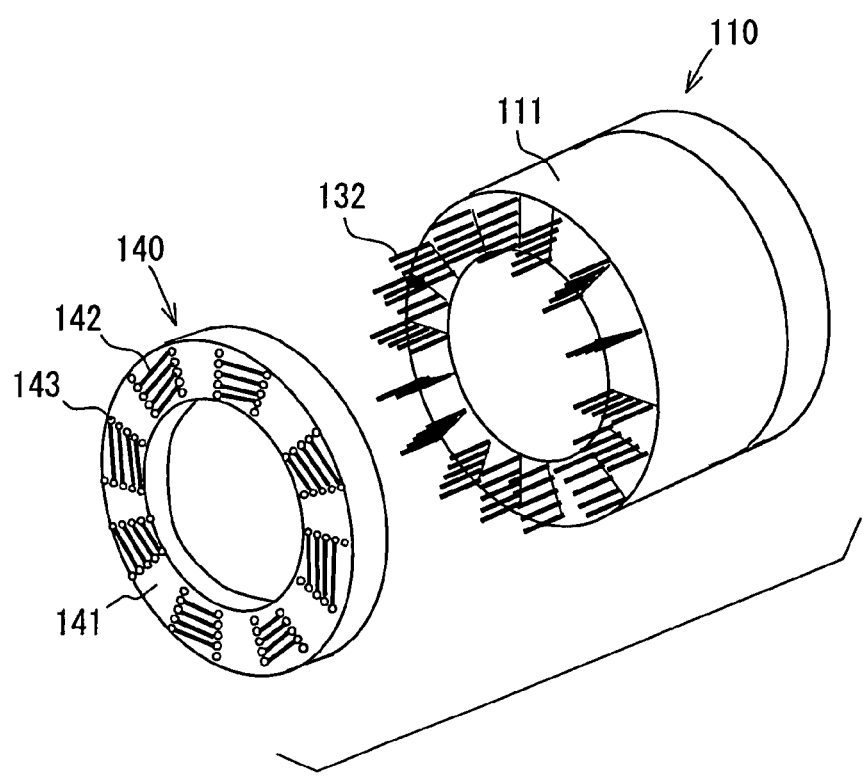
FIG. 12 is a perspective view illustrating a modification to a coil end before it is assembled.

Further, one base material 141 is provided with a plurality of wiring portions 142, and a plurality of sets of conductor stacks 132 are connected together by one connecting member 140. The construction illustrated in FIG. 12 as an example may be adopted. That is, an annular base material 141 is provided with wiring portions 142 and through holes 143 in correspondence with the ends of conductor stacks 132 externally exposed from the annular core 111. Corresponding conductor stacks 132 are electrically connected together by one connecting member 140. With this construction, the configuration of the motor can be simplified to enhance the productivity.

Fifth Embodiment

Figure 13A:
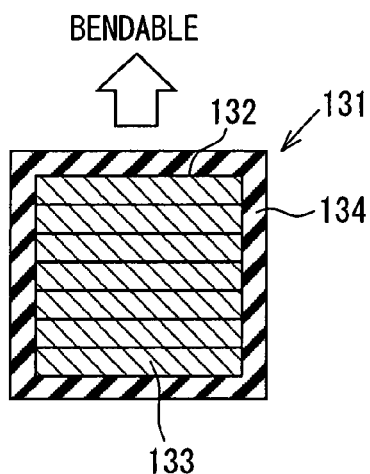
FIG. 13A is a sectional view of a winding, illustrating an example of a coil end in a fifth embodiment of the present invention.
Figure 13B:
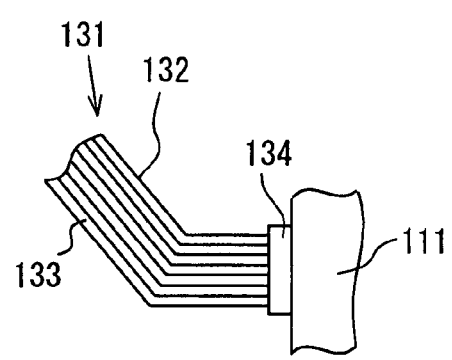
FIG. 13B is a side view illustrating the bent state of the winding, illustrating an example of the coil end in the fifth embodiment.

In the fifth embodiment, as illustrated in FIG. 13A, the conductor stack 132 is bent. In the winding 131, the conductor stack 132 constructed by stacking conductor constructional elements 133 (or conductor constructional elements 135) can be relatively easily bent in the direction of stacking. Meanwhile, it is difficult to bend it in a direction orthogonal to the direction of stacking. Consequently, this embodiment takes the following measure: the ends of some of a plurality of conductor stacks 132 externally exposed from the slots 112 in the core 111 are bent in the direction of stacking to an angle other than 90 degrees, as illustrated in FIG. 13B. When the coil 130 is constructed, the degree of freedom in routing the windings 131 is enhanced as compared with cases where only linear conductor stacks 132 are adopted. In the example illustrated in FIG. 13B, there is one bent portion. However, more than one bent portion may be provided.

Figure 14A:
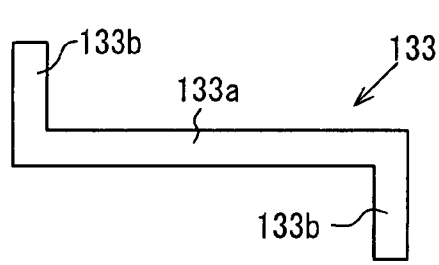
FIG. 14A is a plan view illustrating an example of a conductor constructional element.
Figure 14B:
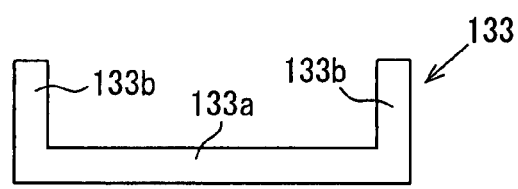
FIG. 14B is another plan view illustrating an example of a conductor constructional element.
Figure 15A:
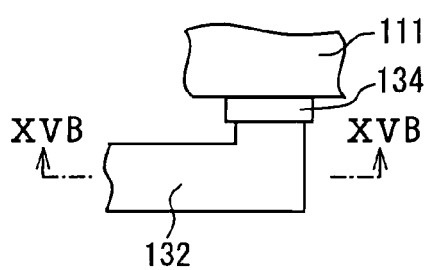
FIG. 15A is a plan view viewed from the direction of stacking, illustrating an example of a coil end using the conductor constructional element illustrated in FIG. 14A.
Figure 15B:
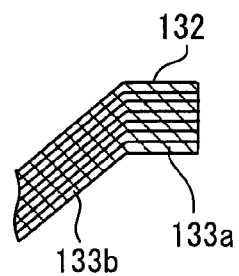
FIG. 15B is a sectional view taken along line XVB-XVB of FIG. 15A.

For example, the constructions illustrated in FIGS. 14A and 14B may be adopted. That is, the conductor constructional element 133 is constructed of: a linear portion 133a to be housed in the slot 112; and bent portions 133b bent from the linear portion 133a at a predetermined angle to the linear portion 133a. Such crank-shaped, cornered U-shaped, or other like conductor constructional elements 133 are stacked to construct the conductor stack 132. With the linear portion 133a of this conductor stack 132 housed in the slot 112, its ends exposed from the core 111 (including the bent portions 133b) are bent in the direction of stacking. Thus, the winding 131 (conductor stack 132) can be routed in the vertical direction and the horizontal direction relative to the direction of extension of the slot 112 in the core 111 as illustrated in FIGS. 15A and 15B. That is, the degree of freedom in routing the conductor stack 132 (winding 131) can be further enhanced. This not only enhances the degree of freedom in routing the conductor stacks 132 when the corresponding conductor stacks 132 are electrically connected together by the connecting member 140. It also makes it possible to electrically connect together the corresponding conductor stacks 132 without use of the connecting member 140.

The end (bent portion 133b) of the conductor stack exposed from the core 111 may be bent in the direction of stacking before it is housed in the slot 112, and thereafter the conductor stack may be housed in the slot 112.

Sixth Embodiment

Figure 16:
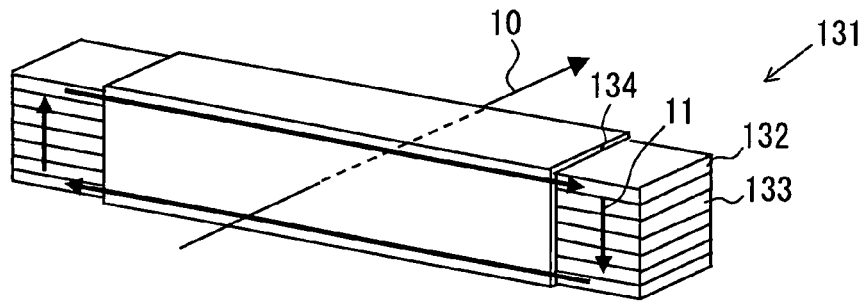
FIG. 16 is a perspective view illustrating what should be improved in the structure of the coil end in the first embodiment.

When the leakage flux 10 is exerted on the conductor stack 132 constructed by stacking conductor constructional elements 133 so that eddy currents 11 generated by the leakage flux 10 are divided, the phenomenon illustrated in FIG. 16 occurs. The eddy currents 11 generated in the conductor constructional elements 133 in the respective layers are directed as follows: that in the conductor constructional element 133 positioned above the center of stacking in the direction of stacking and that in the conductor constructional element 133 below the center of stacking are in opposite directions. Therefore, in the construction in which the conductor constructional elements 133 are electrically connected together at both ends of the conductor stack 132, the following takes place as illustrated in FIG. 16: the eddy current 11 that flows in a loop through the ends of the conductor constructional elements 133 joined together is generated; and this reduces the effect of reducing eddy-current loss by the stacked construction.

In this embodiment, to cope with this, the coil end structure of two linear conductor stacks 132 coupled together is so constructed that: the eddy current 11 generated in one conductor stack 132 is canceled out by the eddy current 11 generated in the other conductor stack 132. The linear conductor stacks are the linear portions 133a of the conductor stacks 132 described in relation to the fifth embodiment. As described later, the two linear conductor stacks 132 may be constructed as one conductor stack unit formed by stacking a plurality of conductor constructional elements 133, including connecting portions for connecting together one ends of the two conductor stacks 132. In the following description, therefore, the linear conductor stack 132 (linear portion 133a) is referred to as a parallel portion. This is because a plurality of linear conductor stacks 132 (linear portions 133a) housed in the slots 112 are parallel one another. Since they are in such a positional relation, eddy currents 11 can be canceled out between them as described later.

Figure 17:
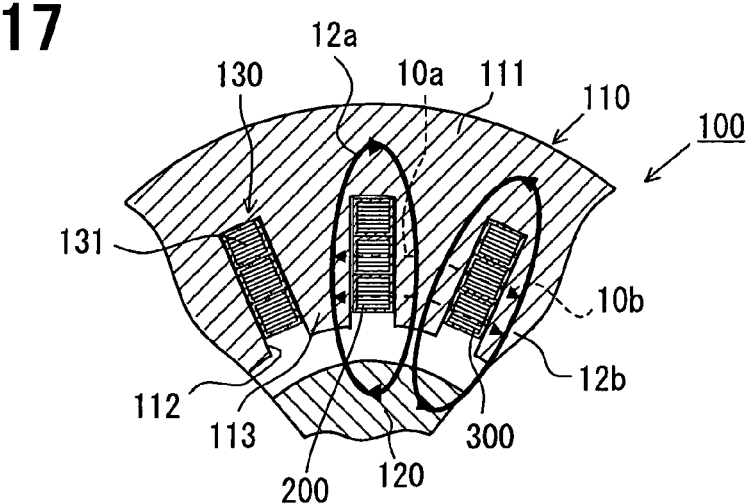
FIG. 17 is a sectional view of a peripheral area of the stator of a motor, illustrating the disposition of a conductor in a sixth embodiment of the present invention.
Figure 18:
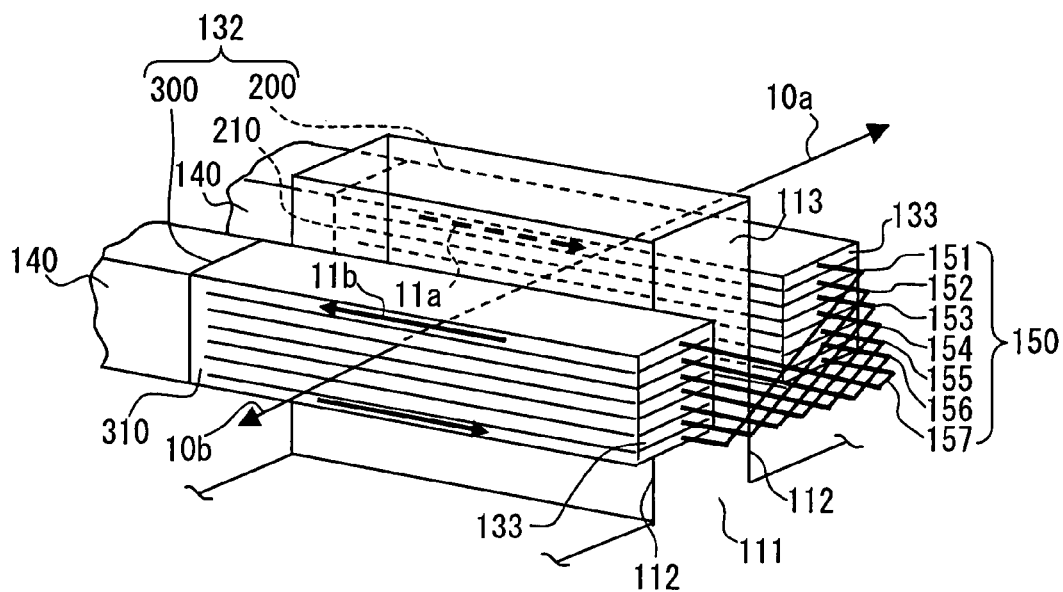
FIG. 18 is a perspective view illustrating a coil end structure in the sixth embodiment.
Figure 19:
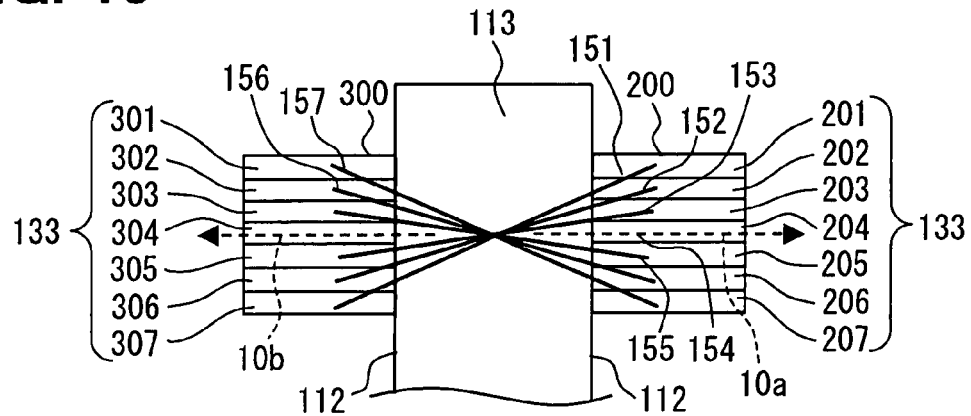
FIG. 19 is a plan view of the peripheral area in FIG. 18 viewed from the coil end side.

In the coil structure in FIG. 17, the coils 130 formed by winding windings 131 in three layers are housed in the plurality of slots 112 provided in the core 111 that constructs the stator 110 of the motor 100 in the similar manner as in first embodiment. Parallel portions 200, 300 are respectively housed in the slots 112 connecting to each other with one and the same tooth 113 in-between. Main magnetic fluxes 12a, 12b generated around the slots 112 in which the parallel portions 200, 300 are housed are in opposite directions to each other. As illustrated in FIG. 17 to FIG. 19, therefore, the leakage fluxes 10a, 10b respectively linked to the parallel portions 200, 300 as conductor stacks 132 are also in opposite directions.

In this embodiment, the parallel portions 200, 300 are respectively formed by stacking seven conductor constructional elements 133 as copper thin plates as in the first embodiment. The parallel portion 200 is constructed by stacking conductor constructional elements 201 to 207 in this order from the side of the protruded tip of the tooth 113. The parallel portion 300 is constructed by stacking conductor constructional elements 301 to 307 in this order from the side of the protruded tip of the tooth 113. The parallel portions 200, 300 have their portions to be housed in the slots 112 covered with the outer insulating member 134 (not shown) similarly with the conductor stack 132 of the first embodiment. One ends of them exposed from the slots 112 (led out of slots 112) on the same side are exposed from the outer insulating member 134, and respectively connected with the connecting member 140 by brazing, welding, or the like. That is, the parallel portions 200, 300 have their conductor stack constructional elements 133 joined together at one ends. A copper wire is adopted for the connecting member 140 as in the first embodiment. Therefore, the connecting member 140 is easy to deform, and can be freely connected with other parallel portions (not shown) or the like.

At ends opposite the ends connected with the connecting member 140, the measure illustrated in FIG. 18 and FIG. 19 is taken. That is, the conductor constructional elements 201 to 207 constructing the parallel portion 200 and the conductor constructional elements 301 to 307 constructing the parallel portion 300 are selectively connected through a connecting portion 150 so that the eddy currents 11*a*, 11*b* generated in the conductor constructional elements 133 (201 to 207, 301 to 307) in the respective layers are canceled out between them by the leakage fluxes 10*a*, 10*b* linked to the parallel portions 200, 300.

The two parallel portions 200, 300 are disposed in slots 112 connecting to each other with the tooth 113 of the core 111 in-between, and the parallel portions 200, 300 are substantially identical in structure with each other. The leakage fluxes 10*a*, 10*b* are symmetrically generated from the tooth 113 of the core 111 with respect to the parallel portions 200, 300 having substantially the same magnitude in opposite directions. Therefore, the eddy current 11*a* is generated in a predetermined number-th layer (n-th layer) from the uppermost layer (conductor constructional element 201) of the parallel portion 200 as viewed from the side of the protruded tip of the tooth 113. The eddy current 11*b* is generated in a predetermined number-th layer (n-th layer) from the lowermost layer (conductor constructional element 307) of the parallel portion 300. The eddy current 11*a* and the eddy current 11*b* are substantially identical in magnitude and are in the same direction.

In this embodiment, between the parallel portions 200, 300, the conductor constructional elements 133 in which the respective eddy currents 11*a*, 11*b* are substantially identical in magnitude and are in the same direction are selectively and conductively connected together through the connecting portion 150. More specifically, the conductor constructional element 201 in the uppermost layer and the conductor constructional element 307 in the lowermost layer are connected together through the connecting portion 151. The conductor constructional element 202 in the second layer and the conductor constructional element 306 in the sixth layer are connected together through the connecting portion 152. The conductor constructional element 203 in the third layer and the conductor constructional element 305 in the fifth layer are connected together through the connecting portion 153. The conductor constructional element 204 in the fourth layer and the conductor constructional element 304 in the fourth layer are connected together through the connecting portion 154. The conductor constructional element 205 in the fifth layer and the conductor constructional element 303 in the third layer are connected together through the connecting portion 155. The conductor constructional element 206 in the sixth layer and the conductor constructional element 302 in the second layer are connected together through the connecting portion 156. The conductor constructional element 207 in the lowermost layer (seventh layer) and the conductor constructional element 301 in the uppermost layer (first layer) are connected together through the connecting portion 157.

With this coil end structure, the following is implemented in two parallel portions 200, 300: the conductor constructional elements 133 in which the eddy currents 11*a*, 11*b* substantially identical in magnitude flow in the same direction are selectively and conductively connected together through the connecting portion 150. Therefore, the generation of the eddy current 11 flowing in a loop through the ends of conductor constructional elements 133 can be suppressed. More specifically, an example is described with respect to a case where two parallel portions 200, 300 and the connecting portion 150 are constructed as one continuous conductor stack unit formed by stacking conductor constructional elements 133 with reference to FIGS. 20A, 20B, in which the outer insulating member 134 is omitted for the sake of simplicity.

Figure 20A:
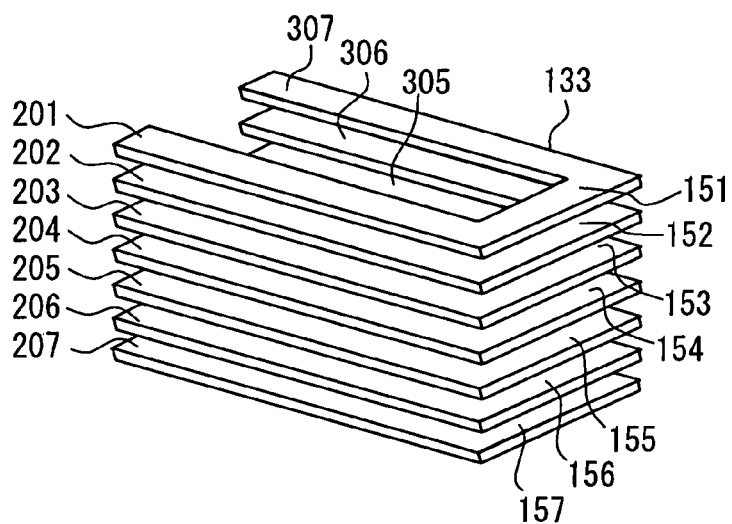
FIG. 20A is a perspective view illustrating a stacking step in constructing a coil end structure in the sixth embodiment.

First, seven conductor constructional elements 133 are prepared. In each of the conductor constructional elements, as illustrated in FIG. 20A, conductor constructional elements to be selectively and conductively connected together and a connecting portion are constructed as one copper thin plate substantially in a cornered U shape. These conductor constructional elements and the connecting portion are the conductor constructional elements 201 to 207 constructing the parallel portion 200, the conductor constructional elements 301 to 307 constructing the parallel portion 300, and the connecting portions 151 to 157 connecting together corresponding conductor constructional elements. The conductor constructional elements 133 are stacked in the order of the stacking of the conductor constructional elements 201 to 207 and integrated. This integration can be carried out by the outer insulating member 134 or the inner insulating member 136 having adhesion properties as in the above embodiments. In this case, the connecting portions 151 to 157 are constructed so as to selectively and conductively connect together corresponding conductor constructional elements by the following, for example: the disposition of the inner insulating members 146 or another insulating material between stack planes; or the contact resistance between stack planes.

Figure 20B:
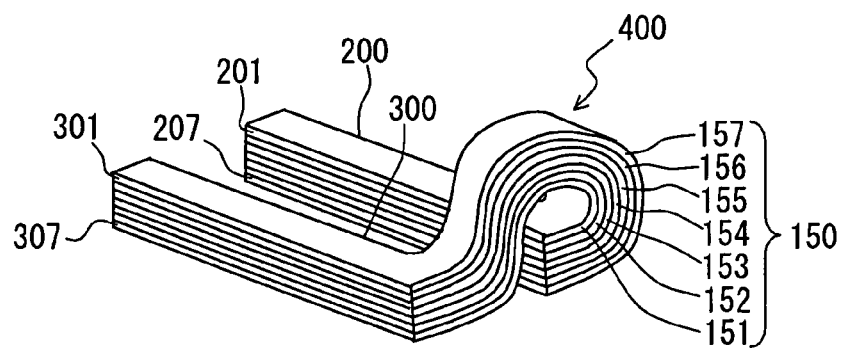
FIG. 20B is a perspective view illustrating a bending step in constructing the coil end structure in the sixth embodiment.

As illustrated in FIG. 20B, subsequently, the parallel portion 300 is rotated 180 degrees (inverted) in the clockwise direction so that the parallel portions 200, 300 are kept in parallel (alignment) with each other with respect to the seven conductor stack constructional elements 133. This is done by, for example, fixing the parallel portion 200 (taking it as a fulcrum) and bending the connecting portion 150 in the direction of its stacking. Thus, the position of the parallel portion 300 relative to the parallel portion 200 after the connecting portion 150 is bent is opposite to the position of the parallel portion 300 before the connecting portion 150 is bent. Further, in the two parallel portions 200, 300, the order of stacking of the conductor constructional elements 133 is inverted. Thus, a conductor stack unit 400 is formed.

In the coil end structure of the conductor stack unit 400 illustrated in FIG. 20B, the connecting portion 150 is also integrated with the parallel portions 200, 300 as conductor stacks 132. Therefore, the number of parts can be reduced. Since the conductor constructional elements 133 that construct the conductor stack unit 400 are formed substantially in a cornered U planar shape, the parallel portions 200, 300 are parallel with each other before bending. Therefore, the manufacturing process (bending step) can be simplified. Further, the generation of the electrical resistance between the parallel portions 200, 300 and the connecting portion 150 can be suppressed. Since bending is carried out in the direction of stacking of the conductor constructional elements 133, the conductor stack unit 400 can be formed without undue stress.

Figure 21:
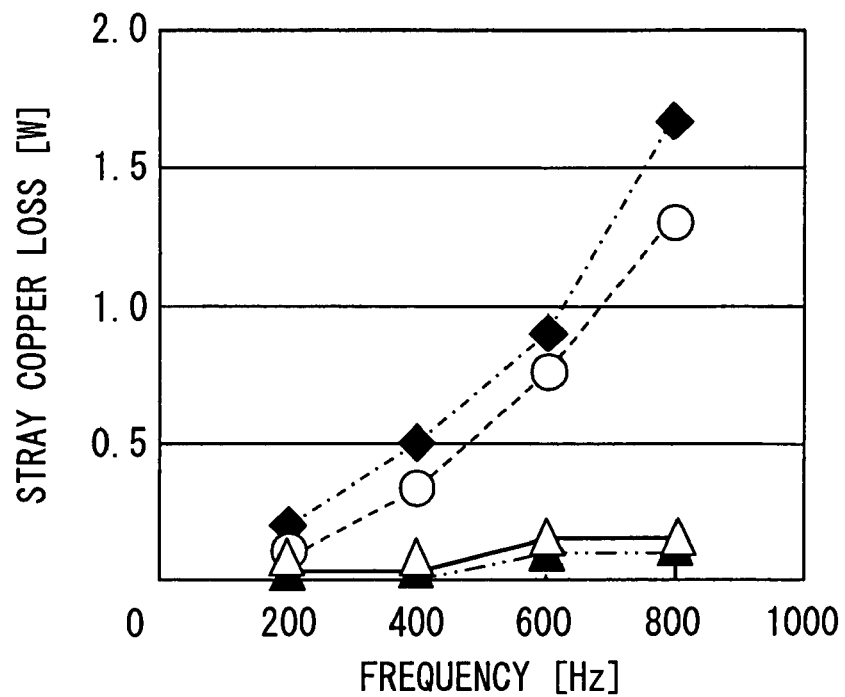
FIG. 21 is a graph illustrating a relation between frequency and stray copper loss, illustrating the effect of the coil end structure in the sixth embodiment.

An experimental test was conducted and its result is illustrated in FIG. 21 as a relation between frequency of currents supplied to the motor and stray copper loss (eddy-current loss) in this embodiment. The result of testing on the coil end structure in this embodiment is indicated by solid line (blank triangles). The result of testing on a structure in which conductor constructional elements 133 are electrically connected together at both ends of the conductor stack 132 is indicated as comparative example 1 by broken line (blank circles). The result of testing on square wires identical in sectional shape is indicated by as comparative example 2 by alternate long and short dash line (solid rectangles). The result of testing on a conductor stack with the ends of its conductor constructional elements not welded is indicated as comparative example 3 by alternate long and two short dashes line (solid triangles). Six flat wires, each 1.95 mm×1.8 mm in sectional area and 90 mm in length, were bundled and this bundle was used as the evaluation sample for comparative example 2. Relative to this sample, six blocks each formed by stacking nine thin plates, 1.95 mm×0.2 mm in sectional area and 90 mm in length, are bundled and this bundle was used as the evaluation samples for comparative example 1 and comparative example 3. Three sets of the above blocks that cancel out an eddy current between them were bundled and this bundle was used as the evaluation sample for this embodiment. A magnetic flux density of 0.15 T was adopted as an evaluation condition.

As illustrated in FIG. 21, the following is apparent: with the coil end structure in this embodiment, indicated by the solid line, the stray copper loss (eddy-current loss) can be more significantly reduced than with comparative example 2, indicated by alternate long and short dash line, and comparative example 1, indicated by broken line, regardless of frequency. The loss reducing effect is substantially the same as the conductor stack with its ends being not connected.

It is apparent that with the construction in which conductor constructional elements 133 are electrically connected together at both ends of the conductor stack 132 (comparative example 1), the effect indicated by the broken line is provided. That is, the stray copper loss can be reduced more than that of the square wires of conventional construction (comparative example 2) indicated by alternate long and short dash line. This is because the sections in which an eddy current 11 flows are limited between the conductor stack constructional elements 133, although the eddy current 11 flowing in a loop through the ends of the conductor constructional elements 133 joined together is generated and this reduces the effect of reducing eddy-current loss by the stacked construction.

Figure 22:
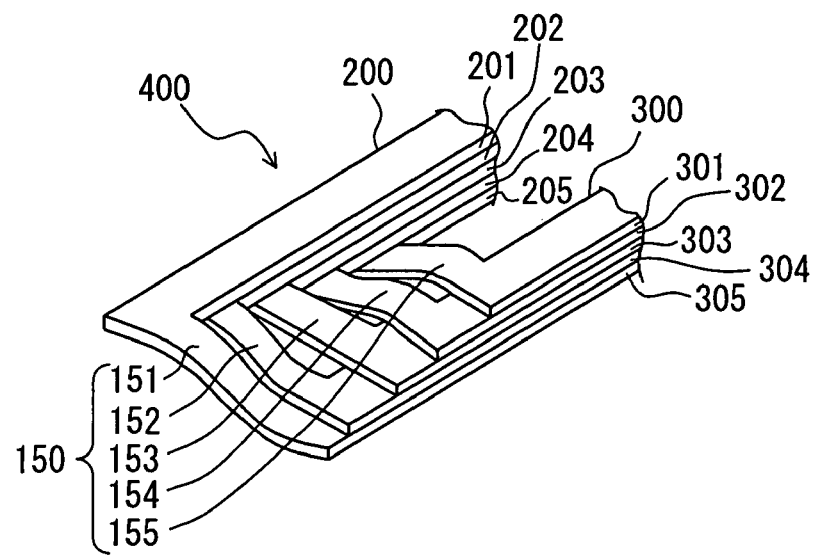
FIG. 22 is a perspective view illustrating a modification to a coil end structure.

The conductor stack unit 400 including the coil end structure formed by stacking and bending conductor constructional elements 133 substantially in a cornered U shape does not always need to be formed by the above method. For example, as illustrated in FIG. 22 as a set of five conductor constructional elements, connecting portions 151 to 155 are bent and the conductor constructional elements 133 substantially in the cornered U shape are displaced in the longitudinal direction and stacked so that the conductor constructional element 201 is positioned in the uppermost layer in the parallel portion 200 and the conductor constructional element 305 is positioned in the lowermost layer in the parallel portion 300. This makes it possible to realize the conductor stack unit 400 having the above coil end structure without performing such bending operation as to invert a parallel portion.

In this embodiment, the conductor constructional elements 133 do not always need to be substantially in a cornered U shape. For example, they may be substantially in a U shape. The positional relation between the parallel portions 200, 300 to which the coil end structure for canceling out eddy currents is not limited to the above example. The same coil end structure as above (FIG. 18 and FIG. 19) can also be applied to the following, for example: parallel portions 200, 300 that are respectively housed in slots 112 distant from each other, not in slots 112 connecting to each other with one and the same tooth 113 in-between, and on which leakage fluxes 10a, 10b are exerted in opposite directions.

Figure 23:
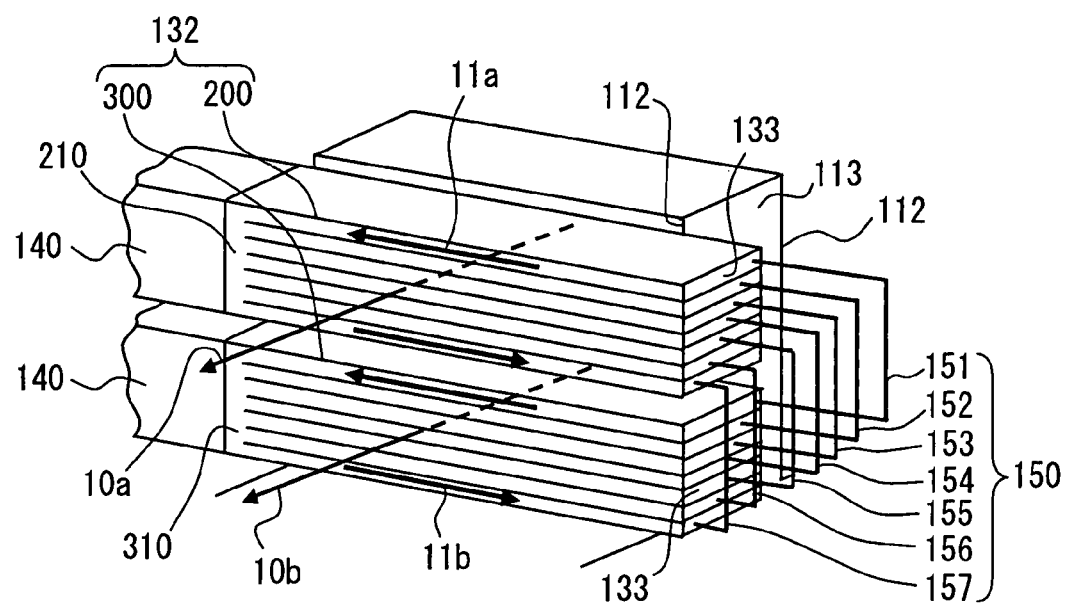
FIG. 23 is a perspective view illustrating a modification to a coil end structure.
Figure 24:
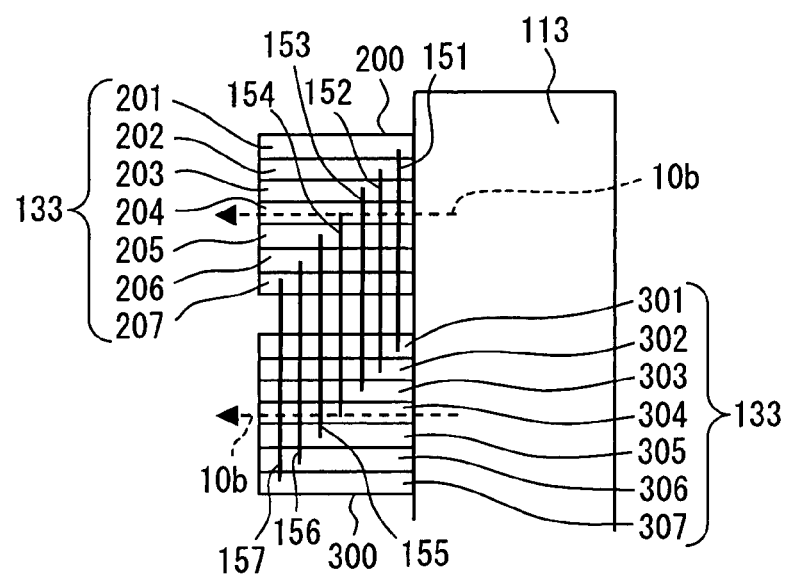
FIG. 24 is a plan view illustrating the modification in FIG. 23 viewed from the coil end side.

Further, the coil end structure for canceling out eddy currents can also be applied to two parallel portions 200, 300 housed in one and same slot 112 as illustrated in FIG. 23 and FIG. 24. When two parallel portions 200, 300 are housed in one and the same slot 112, the leakage fluxes 10a, 10b respectively exerted on them becomes substantially equal in magnitude and direction. Thus, in the parallel portions 200, 300 of substantially equal construction, eddy currents 11a, 11b generated in layers (conductor constructional elements 133) equal in the order of stacking as viewed from the side of the protruded tip of the tooth 113 are substantially equal in magnitude and direction. Therefore, the measure illustrated in FIG. 23 and FIG. 24 can be taken. That is, layers (conductor constructional elements 133) equal in the order of stacking as viewed from the side of the protruded end of the tooth 113 can be conductively connected together through the connecting portion 150 between the parallel portions 200, 300. In this case, for example, the conductor constructional element 201 in the uppermost layer (first layer) in the parallel portion 200 and the conductor constructional element 301 in the uppermost layer (first layer) in the parallel portion 300 are connected with each other through the connecting portion 151. In FIG. 23 and FIG. 24, the outer insulating member 134 is omitted for simplicity. The above coil end structure does not always need to be applied to two parallel portions 200, 300 housed in one and the same slot 112. It can also be adopted for parallel portions 200, 300 that are housed in different slots 112 and on which leakage fluxes 10a, 10b are exerted in the same direction to cancel out eddy currents 11a, 11b between them.

In this embodiment, the eddy currents 11a, 11b generated by the leakage fluxes 10a, 10b are increased as it becomes close to an end of stacking of the parallel portions 200, 300 in the direction of stacking. Therefore, the following measure may be taken: at least one layer in the surfaces of stacking (uppermost layer and lowermost layer) is only coupled with a corresponding layer through the connecting portion 150; and the remaining layers are electrically connected together and coupled together in a lump. With this construction, two parallel portions 200, 300 different in the number of conductor stack constructional elements from each other can be coupled together. However, the construction in which two parallel portions 200, 300 of substantially the same structure are coupled together can more effectively cancel out eddy currents 11.

Seventh Embodiment

In this embodiment, linear conductor constructional elements are used to realize the coil end structure described in relation to the sixth embodiment (FIG. 18).

Figure 25A:
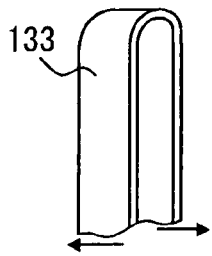
FIG. 25A is a perspective view illustrating a first bending step in constructing a coil end in a seventh embodiment of the present invention.
Figure 25B:
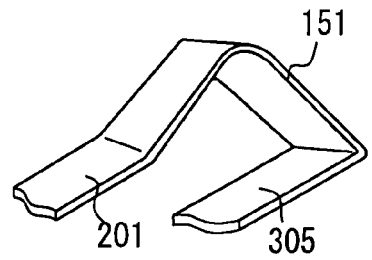
FIG. 25B is a perspective view illustrating a second bending step in constructing the coil end in the seventh embodiment.
Figure 25C:
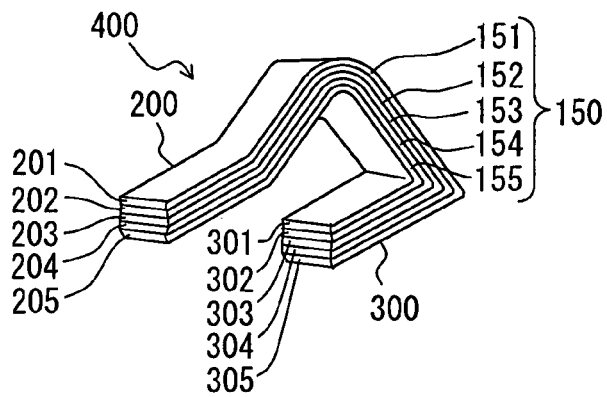
FIG. 25C is a perspective view illustrating a stacking step in constructing the coil end in the seventh embodiment.

First, the linear conductor constructional element 133 is prepared. The conductor constructional element 133 is then bent in the direction in which the conductor constructional element 133 is stacked in a plurality of layers and formed substantially into a U shape as illustrated in FIG. 25A. Thus, the planes of the conductor constructional element 133 are opposite to face each other in the vertical direction between the portion from which the parallel portion 200 is formed later and the portion from which the parallel portion 300 is formed later. Subsequently, both ends of the conductor constructional element are opened in the opposite directions perpendicular to the direction of stacking as illustrated by arrows in FIG. 25A. Thereafter, the following portions are defined as illustrated in FIG. 25B: a portion (e.g., the conductor constructional element 201) that constructs the parallel portion 200; a portion (e.g., the conductor constructional element 305) that constructs the parallel portion 300; and a portion (e.g., the connecting portion 151) that constructs the connecting portion 150. Further, the conductor constructional element 133 is bent in the direction of stacking so that the portions constructing the parallel portions 200, 300 are brought into the substantial parallel (alignment) relation with each other. As illustrated in FIG. 25C, the conductor constructional elements 133 each bent as above are stacked in five layers and integrated to form the conductor stack unit 400. With this construction, the conductor constructional elements 133 prepared beforehand can be simplified.

Figure 26A:
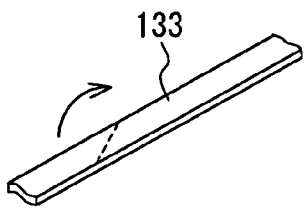
FIG. 26A is a perspective view illustrating a preparing step in a modification to a method for constructing a coil end.
Figure 26B:
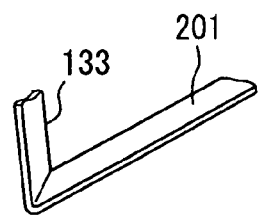
FIG. 26B is a perspective view illustrating a first bending step in the modification to the method for constructing the coil end.
Figure 26C:
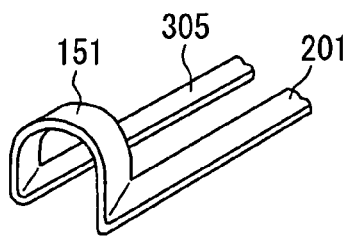
FIG. 26C is a perspective view illustrating a second bending step in the modification to the method for constructing the coil end.
Figure 26D:
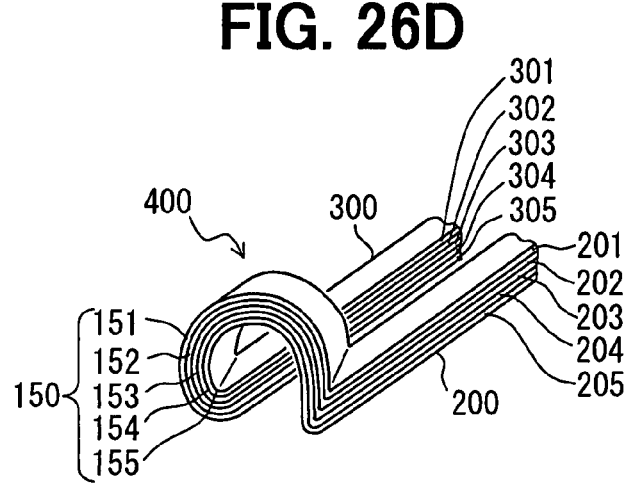
FIG. 26D is a perspective view illustrating a stacking step in the modification to the method for constructing the coil end.

The method for forming the conductor stack unit 400 using the linear conductor constructional elements 133 is not limited to the above example. For example, it may be formed by the method illustrated in FIGS. 26A to 26D. FIG. 26A illustrates a preparing step; FIG. 26B illustrates a first bending step; FIG. 26C illustrates a second bending step; and FIG. 26D illustrates a stacking step. Also, in FIG. 26D, the outer insulating member 134 is omitted for simplicity. Also, in the example illustrated in FIGS. 26A to 26D, the conductor stack unit 400 of five-layer structure is formed. The linear conductor constructional element 133 illustrated in FIG. 25A is bent at a substantially right angle at the portion indicated by a broken line so as to define a portion that constructs the parallel portion 200 or the parallel portion 300. Thus, the bent conductor constructional element 133 is provided as illustrated in FIG. 25B. At this time, a portion (conductor constructional element 201) that construct the parallel portion 200 (parallel portion 300) is defined. Substantially, the following portions are defined as illustrated in FIG. 26C: the portion (conductor constructional element 201) that constructs the parallel portion 200; a portion (conductor constructional element 305) that constructs the parallel portion 300; and a portion (connecting portion 151) that constructs the connecting portion 150. Further, the conductor constructional element 133 is bent so that the portions constructing the parallel portions 200, 300 are brought into substantial parallel (alignment) with each other. Thus, the planes of the conductor constructional element 133 are opposite to each other in the vertical direction between the portion constructing the parallel portion 200 and the portion constructing the parallel portion 300. The conductor constructional element 133 bent as above is stacked in five layers and integrated as illustrated in FIG. 26D. Thus, the conductor stack unit 400 is formed.

Eighth Embodiment

Figure 27A:
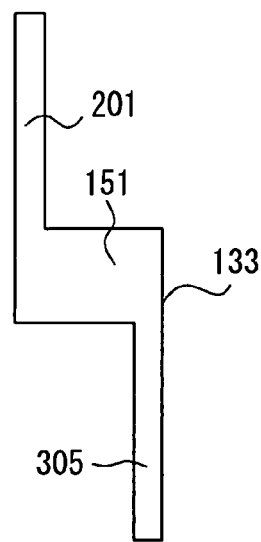
FIG. 27A is a perspective view illustrating a preparing step in constructing a coil end in an eighth embodiment of the present invention.
Figure 27B:
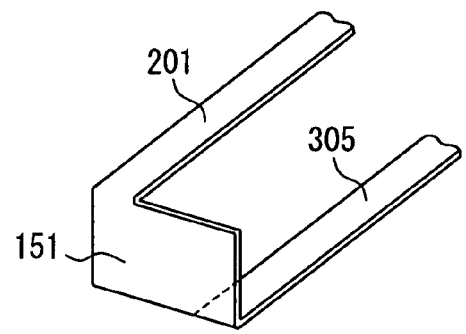
FIG. 27B is a perspective view illustrating a bending step in constructing the coil end in the eighth embodiment.
Figure 27C:
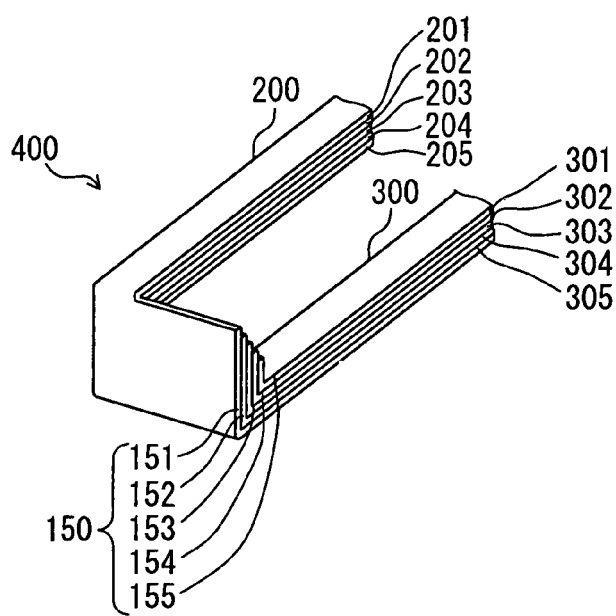
FIG. 27C is a perspective view illustrating a stacking step in constructing the coil end in the eighth embodiment.

In the eighth embodiment, the conductor constructional elements 133 are formed in crank-like planar shape as illustrated in FIG. 27 to realize the coil end structure in the sixth embodiment (FIG. 18). In this conductor constructional element 133, the following portions are defined: a portion (connecting portion 151) that constructs the connecting portion 150; a portion (conductor constructional element 201) that constructs the parallel portion 200; and a portion (conductor constructional element 305) that constructs the parallel portion 300. Subsequently, the portion (conductor constructional element 201) that constructs the parallel portion 200 and the portion (conductor constructional element 305) that constructs the parallel portion 300 are bent as illustrated in FIG. 27B. They are bent substantially perpendicularly in the same direction relative to the portion (connecting portion 151) that constructs the connecting portion 150. Thus, the planes of the conductor constructional element 133 are opposite to each other in the vertical direction between the portion constructing the parallel portion 200 and the portion constructing the parallel portion 300. The conductor constructional element 133 bent as mentioned above is stacked in five layers, and they are integrated. Thus, the conductor stack unit 400 illustrated in FIG. 27C can be formed.

Ninth Embodiment

Figure 28A:
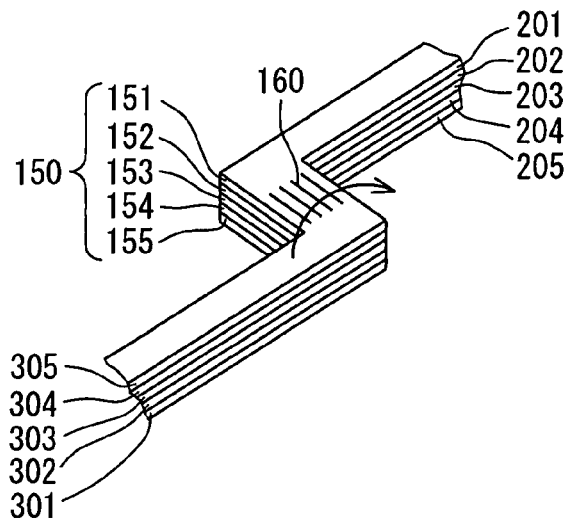
FIG. 28A is a perspective view illustrating a stacking step in constructing a coil end in a ninth embodiment of the present invention.
Figure 28B:
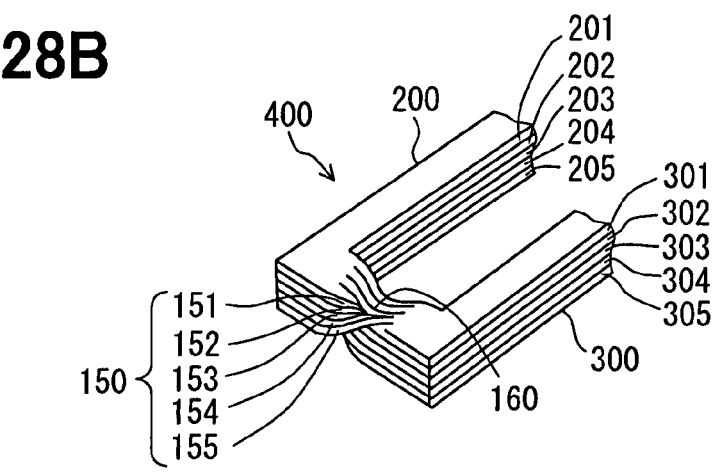
FIG. 28B is a perspective view illustrating a bending step in constructing the coil end in the ninth embodiment.

In the ninth embodiment, slits 160 are formed in part of the conductor constructional element 133 as illustrated in FIG. 28A. The conductor constructional element 133 is twisted at the slit formation portion as illustrated in FIG. 28B to provide the coil end structure for canceling out eddy currents 11. Thus, the conductor stack unit 400 of five-layer structure is formed.

Specifically, the conductor constructional element 133 in the crank-like planar shape is provided as in the eighth embodiment. In this conductor constructional element, the following portions are defined: a portion (connecting portion 151) that constructs the connecting portion 150; a portion (conductor constructional element 201) that constructs the parallel portion 200; and a portion (conductor constructional element 305) that constructs the parallel portion 300. In this embodiment, this conductor constructional element 133 is provided in its portion constructing the connecting portion 150 with a plurality of slits 160 along the direction of the length. The conductor constructional element 133 provided with the slits 160 is stacked in five layers, as illustrated in FIG. 28A. Subsequently, as illustrated in FIG. 28B, the parallel portion 300 is rotated 180 degrees (inverted) so that it is brought into parallel (alignment) with the parallel portion 200. This is done by, for example, fixing the parallel portion 200 (taking it as a fulcrum) and twisting the connecting portion 150 having the slits 160. Thus, in the two parallel portions 200, 300, the order of stacking of the conductor constructional elements 133 is inverted. The conductor stack unit 400 can also be formed by providing slits 160 to intentionally reduce the rigidity so that the conductor constructional elements can be bent (twisted) in a direction other than the direction of stacking.

Figure 29:
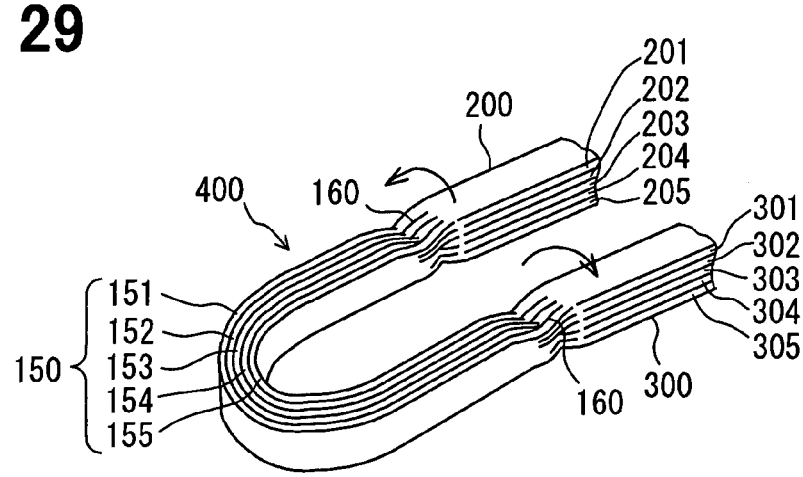
FIG. 29 is a perspective view illustrating a modification to a conductor stack unit.

The slits 160 are provided to intentionally reduce the rigidity so that the conductor constructional elements can be bent (twisted) in a direction other than the direction of stacking. Therefore, the position of their formation or their direction is not limited to the above example. For example, a plurality of slits 160 may be provided in a portion constructing the connecting portion 150 along the direction of the short sides. Alternatively, the slits 160 may be provided in boundaries between a portion that constructs the connecting portion 150 and portions that construct the parallel portions 200, 300. For example, in the conductor constructional elements 133 substantially in a U shape (FIG. 25A), slits 160 are provided in the boundaries between a portion that constructs the connecting portion 150 and portions that construct the parallel portions 200, 300. After the stacking step, the parallel portions 200, 300 are rotated 90 degrees in opposite directions, as illustrated in FIG. 29 to construct the conductor stack unit 400.

Tenth Embodiment

Figure 30A:
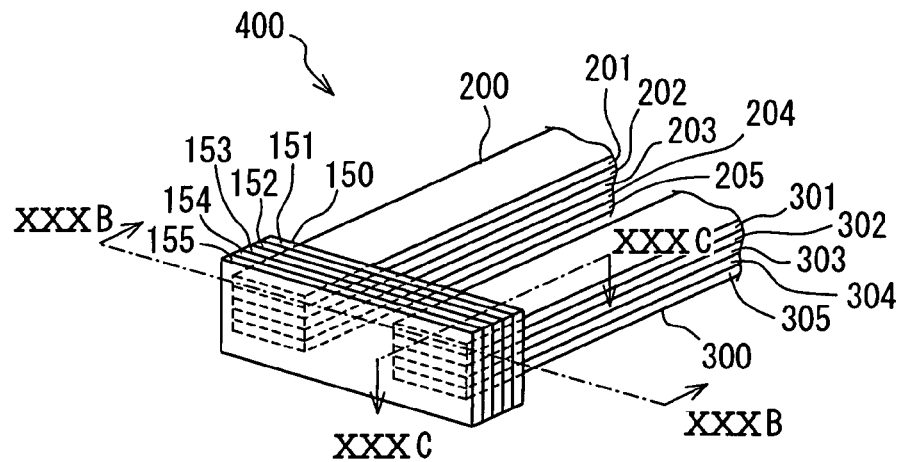
FIG. 30A is a perspective view illustrating a coil end in a tenth embodiment of the present invention.
Figure 30B:
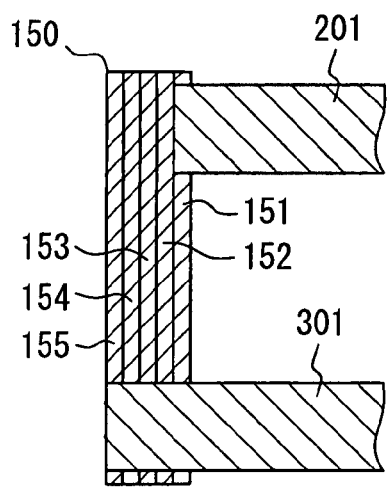
FIG. 30B is a sectional view taken along line XXXB-XXXB of FIG. 30A.
Figure 30C:
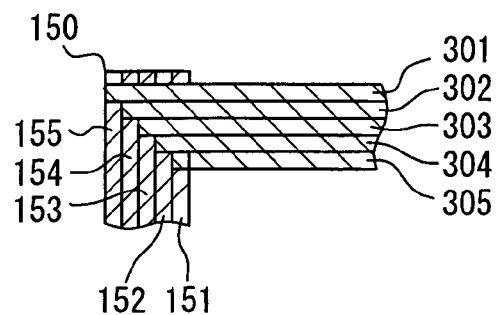
FIG. 30C is a sectional view taken along line XXXC-XXXC of FIG. 30A.

In the tenth embodiment, as illustrated in FIGS. 30A to 30C, the two parallel portions 200, 300 and the connecting portion 150 are individually constructed as separate members. With this construction, the degree of freedom in routing the windings 131 can be enhanced.

Specifically, the parallel portion 200, parallel portion 300, and connecting portion 150 are parts separate from one another. The parallel portion 200 is constructed by stacking five conductor constructional elements 201 to 205 so that the conductor constructional element 201 is positioned in the uppermost layer. The parallel portion 300 is constructed by stacking five conductor constructional elements 301 to 305 so that the conductor constructional element 301 is positioned in the uppermost layer. The connecting portion 150 is constructed by stacking five connecting portions 151 to 155 composed of copper thin plates like the conductor constructional elements 201 to 205, 301 to 305. The connecting portion 151 is positioned in the front layer and is opposed to the two parallel portions 200, 300 disposed in parallel (alignment).

In the connecting portion 150, through holes are formed for making the conductor constructional elements 201 to 205, 301 to 305 reach the connecting portions 151 to 155 in predetermined layers. Only the ends of the conductor constructional elements 201 to 205, 301 to 305 made to reach the connecting portions 151 to 155 in the predetermined layers through the through holes and the wall faces of the through holes in the connecting portions 151 to 155 in the predetermined layers are selectively and conductively connected. For example, the connecting portions 151 to 155 are respectively provided with through holes. When the connecting portions are stacked, these through holes are connected for making the conductor constructional elements 301 reach the connecting portion 155. With respect to the end of the conductor constructional element 301 inserted into the through holes, its portion inserted into the through holes in the connecting portions 151 to 154 is insulated and separated from the connecting portions 151 to 154. Only its portion inserted into the through hole in the connecting portion 155 is electrically connected with the connecting portion 150. This selective conductive connection can be achieved by, for example, selectively exposing the conductor constructional elements 201 to 207, 301 to 307 or the wall faces of the through holes in the connecting portions 151 to 155 from the insulating coating material.

The coil end structure in the sixth embodiment can also be realized by a conductor stack unit 500 provided by assembling together the parallel portion 200, parallel portion 300, and connecting portion 150 constructed as separate parts.

In this embodiment, the individual connecting portions 151 to 155 that construct the connecting portion 150 are formed using the material of the conductor constructional elements 133 that construct the parallel portions 200, 300 as conductor stacks 132 so that a unit formed by connecting the two parallel portions 200, 300 by the connecting portion 150 is provided as the conductor stack unit 500. However, the material of the connecting portions 151 to 155 is not limited to the above example. Materials other than that of the conductor constructional elements 133 may be adopted to construct the connecting portions.

The present invention is not limited to the above embodiments and modifications, and it may be further modified and embodied as follows without departing from the subject matter of the invention.

The embodiments need not be so constructed that coils are divided on a phase-by-phase basis. Further, the embodiments may employ the above constructions in a rotor, not in a stator, of a motor. The embodiments may be various devices other than a motor as long as they are electromagnetic devices including a plurality of coils formed by winding conductors and it is so constructed that an eddy current due to a leakage flux is generated in at least some of the conductors. For example, the electromagnetic device may be a transformer and the like, in which a core need not be provided.

The outer insulating member 134 only has to be disposed between the conductor stack 132 and another member having a potential difference relative to the conductor stack 132. Therefore, it need not be integrated with the conductor stack 132. For example, it may be integrated with another member.

Figure 31:
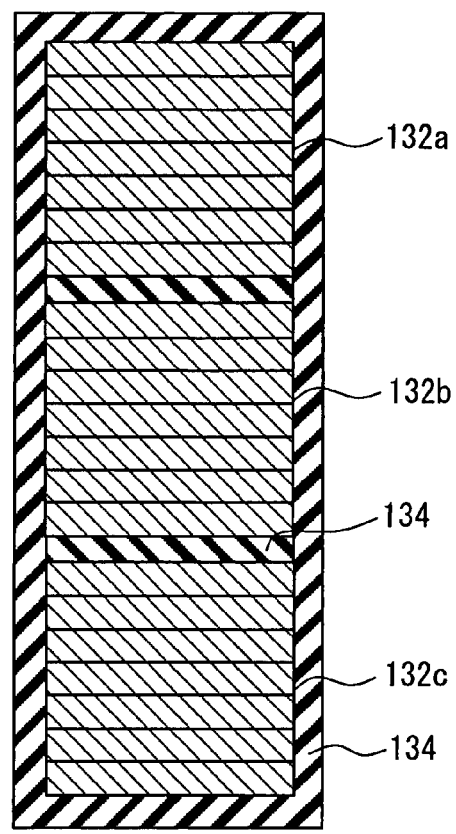
FIG. 31 is a sectional view illustrating a modification.

As illustrated in FIG. 31, a plurality of conductor stacks 132a to 132c that are not electrically connected with one another may be integrated. Thus, electrical insulation can be ensured between the conductor stacks 132a to 132c by disposing the outer insulating member 134 also in the following places: between the conductor stack 132a and the conductor stack 132b connecting to each other; and between the conductor stack 132b and the conductor stack 132c connecting to each other. This integration enhances the productivity. The number of integrated conductors is not limited to the above example. The insulating members for insulating connecting conductors from each other may be constructed under conditions (material and/or thickness) different from those for the outer insulating member 134 disposed on the outer circumferential surface.

Figure 32:
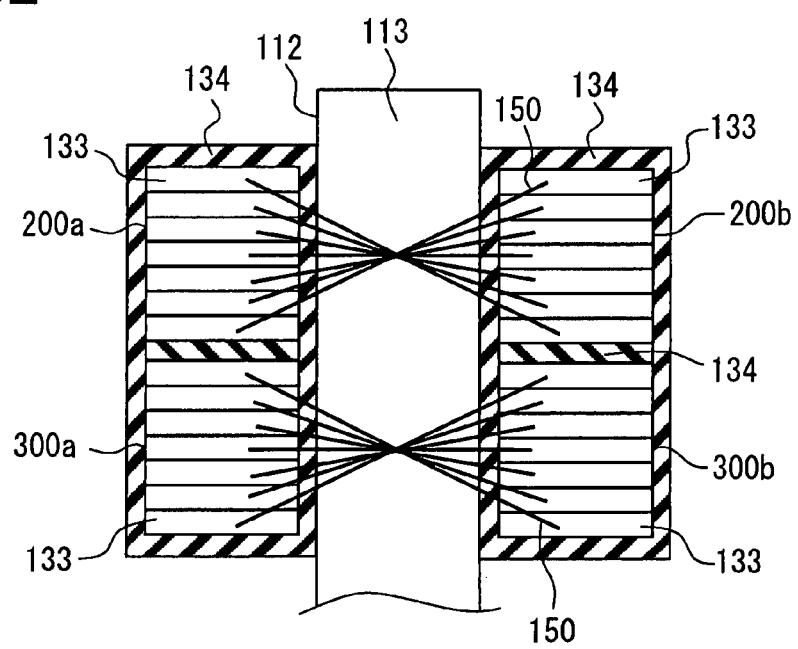
FIG. 32 is a plan view illustrating another modification.

The coil end structure in the sixth embodiment (FIG. 18) may be applied to the construction illustrated in, for example, FIG. 32. In this construction, a plurality of conductor stacks 200a, 300a are integrated and a plurality of conductor stacks 200b, 300b are integrated. The coil end structure in the sixth embodiment is respectively applied to the conductor stacks 200a, 200b opposed to each other with the tooth 113 in-between and to the conductor stacks 300a, 300b opposed to each other with the tooth 113 in-between. Thus, eddy-current loss can be further reduced.

The example illustrated in FIG. 32 may be modified as follows: the outer insulating member 134 is not disposed or only the inner insulating member 136 is disposed between the conductor stacks 200a, 300a (conductor stacks 200b, 300b) housed in one and the same slot 112. Even when the conductor stack is constructed by stacking a plurality of conductor constructional elements 133, eddy-current loss can be further reduced by taking the following measure: the conductor stacks are divided into a plurality of blocks constructed of a plurality of conductor constructional elements 133; and the coil end structure in the sixth embodiment (FIG. 18) is applied to, for example, each of the conductor stack blocks opposed to each other with the tooth 113 in-between. This construction is effective for cases where a large number of conductor constructional elements 133 are stacked in one conductor stack and the conductor stack is thick as a whole, and it is difficult to bend or twist the conductor constructional elements in a lump.

What is claimed is:

1. An electromagnetic device comprising a plurality of coils, wherein each coil includes:
  a winding of a conductor, wherein at least a part of the conductor is a conductor stack so that an eddy current generated by a leakage flux linked to the conductor is divided;
  an insulating member disposed only on an outer circumferential surface of the conductor; and
  a core on which the conductor stack is wound, wherein:
  the outer insulating member is disposed between the conductor stack and the core;
  the coil is inserted and fixed in a slot provided in the core;
  the coil further includes a connecting member, which connects the conductor constructional elements together at an end of the conductor stack exposed from the slot to outside of the core and the end of the conductor stack is electrically connected with another conductor;
  the connecting member has a wiring portion provided in a base material composed of an insulating material; and
  the conductor stack is positioned and fixed on the base material and the end is electrically connected with the wiring portion and electrically connected with the another conductor through the wiring portion.

2. The electromagnetic device of claim 1, wherein:
  the conductor stack includes a stack of a plurality of conductor constructional elements contacting each other.

3. The electromagnetic device of claim 1, wherein:
  the conductor stack includes a stack of a single conductor constructional element folded a plurality of times in opposite directions alternately to contact each other.

4. An electromagnetic device comprising a plurality of coils, wherein each coil includes:
  a winding of a conductor, wherein at least a part of the conductor includes a conductor stack so that an eddy current generated by a leakage flux linked to the conductor is divided;

an outer insulating member disposed on an outer circumferential surface of the conductor; and
an inner insulating member smaller in thickness than the outer insulating member and disposed between two layers connecting to each other, wherein:
the conductor stack includes a stack of a plurality of conductor constructional elements;
the inner insulating member is disposed between two conductor constructional elements adjoining to each other;
the conductor includes two parallel portions as two conductor stacks disposed in substantially parallel with each other and a connecting portion connecting together one ends of the two parallel portions; and
the two parallel portions have the conductor constructional elements selectively and conductively connected together through the connecting portion between the two parallel portions at the end on the side on which the parallel portions are coupled together so that the eddy current generated in each of the conductor constructional elements is canceled out and the conductor stack constructional elements are conductively connected together at the other end with respect of each parallel portion.

5. The electromagnetic device of claim 4, wherein:
the inner insulating member is adhesive fixing together the conductor constructional elements adjoining to each other.

6. The electromagnetic device of claim 4, wherein:
the conductor stack includes a stack of a single conductor constructional element folded a plurality of times in opposite directions alternately.

7. The electromagnetic device of claim 1, wherein:
the connecting member has a hole provided in the base material; and
the conductor stack has part thereof inserted in the hole and fixed on the base material.

8. The electromagnetic device of claim 1, further comprising:
an electronic component mounted on the base material separately from the coil.

9. The electromagnetic device of claim 1, wherein:
the coil is inserted and fixed in a slot provided in the core;
the conductor stack has an end thereof exposed from the slot to outside the core and bent in the direction of stacking; and
the conductor constructional elements are electrically connected together at the end with another conductor.

10. The electromagnetic device of claim 9, wherein:
the coil is inserted and fixed in a slot provided in the core;
the conductor constructional elements of the conductor stack have portions thereof corresponding to the end bent in a direction of length of the portion inserted into the slot in a plane orthogonal to the direction of stacking; and
the bent portions are bent in a direction of stacking and electrically connected with the another conductor.

11. The electromagnetic device of claim 4, wherein:
the two parallel portions are identical with each other in the number of the conductor constructional elements; and
the conductor constructional elements, in which the eddy currents substantially identical in magnitude are generated in the same direction between the two parallel portions, are selectively and conductively connected together.

12. The electromagnetic device of claim 11, wherein:
the two parallel portions on which the leakage fluxes are respectively exerted in opposite directions and the connecting portion connecting together the parallel portions are constructed as one continuous conductor provided by stacking the plurality of conductor constructional elements; and
the order of stacking of the conductor constructional elements is reversed between the parallel portions.

13. The electromagnetic device of claim 12, wherein:
the plurality of conductor constructional elements are substantially in a cornered U planar shape, and bent so that orders of stacking of the conductor constructional elements are reversed between the parallel portions.

14. The electromagnetic device of claim 12, wherein:
the plurality of conductor constructional elements are substantially in a linear planar shape, and are bent so that orders of stacking of the conductor constructional elements are reversed between the two parallel portions.

15. The electromagnetic device of claim 4, wherein:
the two parallel portions and the connecting portion are individually constructed as separate members.

16. The electromagnetic device of claim 4, further comprising:
a core on which the coils are wound;
the parallel portions are inserted and fixed in a slot provided in the core, and
the outer insulating member is disposed on a portion of the outer circumferential surface of the parallel portions, which are opposed to the core.

17. The electromagnetic device of claim 1, further comprising:
a core; and
a coil unit including two coils wound on the core in opposite directions and electrically connected to each other, wherein only one of the coils, on which leakage flux is more strongly exerted than the other of the coils, is constructed of the conductor stack.

18. The electromagnetic device of claim 1, wherein:
the insulating member is disposed at least on a portion of the outer circumferential surface of the conductor stack opposed to another conductor stack of a different phase in a same slot of a core.

19. The electromagnetic device of claim 1, wherein:
the insulating member is provided in a cylindrical shape along a direction of length of the conductor stack so that the insulating member encircles the conductor stack.

20. An electromagnetic device comprising a plurality of coils, wherein each coil includes:
a winding of a conductor, wherein at least a part of the conductor is a conductor stack so that an eddy current generated by a leakage flux linked to the conductor is divided;
an insulating member disposed only on an outer circumferential surface of the conductor;
a core; and
a coil unit including two coils wound on the core in opposite directions and electrically connected to each other, wherein only one of the coils, on which leakage flux is more strongly exerted than the other of the coils, is constructed of the conductor stack.

21. The electromagnetic device of claim 20, wherein:
the insulating member is disposed at least on a portion of the outer circumferential surface of the conductor stack opposed to another conductor stack of a different phase in a same slot of a core.

22. The electromagnetic device of claim 20, wherein:
the insulating member is provided in a cylindrical shape along a direction of length of the conductor stack so that the insulating member encircles the conductor stack.

* * * * *